(12) United States Patent
Black

(10) Patent No.: US 9,224,427 B2
(45) Date of Patent: Dec. 29, 2015

(54) RATING MEDIA ITEM RECOMMENDATIONS USING RECOMMENDATION PATHS AND/OR MEDIA ITEM USAGE

(75) Inventor: Gary Black, Cary, NC (US)

(73) Assignee: Napo Enterprises LLC, Wilmington, DE (US)

(*) Notice: Subject to any disclaimer, the term of this patent is extended or adjusted under 35 U.S.C. 154(b) by 2089 days.

(21) Appl. No.: 11/695,327

(22) Filed: Apr. 2, 2007

(65) Prior Publication Data

US 2008/0243733 A1   Oct. 2, 2008

(51) Int. Cl.
*G06F 7/00* (2006.01)
*G06F 17/30* (2006.01)
*G06F 15/16* (2006.01)
*G11B 27/28* (2006.01)
*H04N 7/173* (2011.01)

(52) U.S. Cl.
CPC ............ *G11B 27/28* (2013.01); *G06F 17/3082* (2013.01); *G06F 17/30752* (2013.01)

(58) Field of Classification Search
CPC .......... G06F 17/3012; G06F 17/30749; G06F 17/30752; G06F 17/30817; G06F 17/3082; G06F 17/30082; G06F 17/30091; G06F 17/30179
USPC ....................... 707/3, 4; 709/217, 227; 725/89
See application file for complete search history.

(56) References Cited

U.S. PATENT DOCUMENTS

| | | | |
|---|---|---|---|
| 4,870,579 A | 9/1989 | Hey | |
| 5,621,456 A | 4/1997 | Florin et al. | |
| 5,771,778 A | 6/1998 | MacLean, IV | |
| 5,956,027 A | 9/1999 | Krishnamurthy | |
| 5,960,437 A | 9/1999 | Krawchuk et al. | |
| 5,963,916 A | 10/1999 | Kaplan | |
| 6,134,552 A | 10/2000 | Fritz et al. | |
| 6,195,657 B1 | 2/2001 | Rucker et al. | |
| 6,266,649 B1 | 7/2001 | Linden et al. | |

(Continued)

FOREIGN PATENT DOCUMENTS

| | | |
|---|---|---|
| CN | 1208930 A | 2/1999 |
| EP | 0898278 A2 | 2/1999 |

(Continued)

OTHER PUBLICATIONS

"Goombah—Preview," http://www.goombah.com/preview.html, printed Jan. 8, 2008, 5 pages.

(Continued)

*Primary Examiner* — James Trujillo
*Assistant Examiner* — Cheryl M Shechtman

(57) ABSTRACT

A media item recommendation rating system and method are provided. A recommendation rating for media items is established and dynamically updated in response to media items being recommended to other users. A recommendation server or other device receives a report of a media item recommendation and updates a recommendation rating in response. The recommendation rating may also be updated based on how often a recommended media item is used or played. Thus, a media item's recommendation rating is affected by events relating to its recommendation, as opposed simple play-based ratings that are updated on any play action regardless of whether related to a recommendation or not. Simple play-based ratings do not distinguish between ordinary usages or plays and those resulting from recommendations.

35 Claims, 13 Drawing Sheets

(56) References Cited

U.S. PATENT DOCUMENTS

| | | |
|---|---|---|
| 6,314,420 B1 | 11/2001 | Lang et al. |
| 6,317,722 B1 | 11/2001 | Jacobi et al. |
| 6,353,823 B1 | 3/2002 | Kumar |
| 6,388,714 B1 | 5/2002 | Schein et al. |
| 6,438,579 B1 | 8/2002 | Hosken |
| 6,498,955 B1 | 12/2002 | McCarthy et al. |
| 6,526,411 B1 | 2/2003 | Ward |
| 6,567,797 B1 | 5/2003 | Schuetze et al. |
| 6,587,127 B1 | 7/2003 | Leeke et al. |
| 6,587,850 B2 | 7/2003 | Zhai |
| 6,609,253 B1 | 8/2003 | Swix et al. |
| 6,615,208 B1 | 9/2003 | Behrens et al. |
| 6,629,104 B1 | 9/2003 | Parulski et al. |
| 6,636,836 B1 | 10/2003 | Pyo |
| 6,654,786 B1 | 11/2003 | Fox et al. |
| 6,662,231 B1 | 12/2003 | Drosset et al. |
| 6,670,537 B2 | 12/2003 | Hughes et al. |
| 6,694,482 B1 | 2/2004 | Arellano et al. |
| 6,757,517 B2 | 6/2004 | Chang |
| 6,757,691 B1 | 6/2004 | Welsh et al. |
| 6,801,909 B2 | 10/2004 | Delgado et al. |
| 6,865,565 B2 | 3/2005 | Rainsberger et al. |
| 6,904,264 B1 | 6/2005 | Frantz |
| 6,912,528 B2 | 6/2005 | Homer |
| 6,941,275 B1 | 9/2005 | Swierczek |
| 6,941,324 B2 | 9/2005 | Plastina et al. |
| 6,947,922 B1 | 9/2005 | Glance |
| 6,973,475 B2 | 12/2005 | Kenyon et al. |
| 6,976,228 B2 | 12/2005 | Bernhardson |
| 6,986,136 B2 | 1/2006 | Simpson et al. |
| 6,987,221 B2 | 1/2006 | Platt |
| 6,990,453 B2 | 1/2006 | Wang et al. |
| 7,013,301 B2 | 3/2006 | Holm et al. |
| 7,035,871 B2 | 4/2006 | Hunt et al. |
| 7,047,406 B2 | 5/2006 | Schleicher et al. |
| 7,072,846 B1 | 7/2006 | Robinson |
| 7,072,886 B2 | 7/2006 | Salmenkaita et al. |
| 7,075,000 B2 | 7/2006 | Gang et al. |
| 7,076,553 B2 | 7/2006 | Chan et al. |
| 7,089,248 B1 | 8/2006 | King et al. |
| 7,096,234 B2 | 8/2006 | Plastina et al. |
| 7,120,619 B2 | 10/2006 | Drucker et al. |
| 7,139,757 B1 | 11/2006 | Apollonsky et al. |
| 7,145,678 B2 | 12/2006 | Simpson et al. |
| 7,171,174 B2 | 1/2007 | Ellis et al. |
| 7,177,872 B2 | 2/2007 | Schwesig et al. |
| 7,219,145 B2 | 5/2007 | Chmaytelli et al. |
| 7,222,187 B2 | 5/2007 | Yeager et al. |
| 7,240,358 B2 | 7/2007 | Horn et al. |
| 7,283,992 B2 | 10/2007 | Liu et al. |
| 7,296,032 B1 | 11/2007 | Beddow |
| 7,305,449 B2 | 12/2007 | Simpson et al. |
| 7,340,481 B1 | 3/2008 | Baer et al. |
| 7,437,364 B1 | 10/2008 | Fredricksen et al. |
| 7,441,041 B2 | 10/2008 | Williams et al. |
| 7,444,339 B2 | 10/2008 | Matsuda et al. |
| 7,463,890 B2 | 12/2008 | Herz et al. |
| 7,496,623 B2 | 2/2009 | Szeto et al. |
| 7,509,291 B2 | 3/2009 | McBride et al. |
| 7,512,658 B2 | 3/2009 | Brown et al. |
| 7,548,915 B2 | 6/2009 | Ramer et al. |
| 7,590,546 B2 | 9/2009 | Chuang |
| 7,594,246 B1 | 9/2009 | Billmaier et al. |
| 7,614,006 B2 * | 11/2009 | Molander ............ 715/764 |
| 7,623,843 B2 | 11/2009 | Squibbs |
| 7,627,644 B2 | 12/2009 | Slack-Smith |
| 7,644,166 B2 | 1/2010 | Appelman et al. |
| 7,653,654 B1 | 1/2010 | Sundaresan |
| 7,676,753 B2 | 3/2010 | Bedingfield |
| 7,680,959 B2 | 3/2010 | Svendsen |
| 7,720,871 B2 | 5/2010 | Rogers et al. |
| 7,725,494 B2 | 5/2010 | Rogers et al. |
| 7,730,216 B1 | 6/2010 | Issa et al. |
| 7,751,773 B2 | 7/2010 | Linden |
| 7,761,399 B2 | 7/2010 | Evans |
| 7,805,129 B1 | 9/2010 | Issa et al. |
| 8,150,724 B1 * | 4/2012 | Robinson .............. 705/7.31 |
| 2001/0013009 A1 | 8/2001 | Greening et al. |
| 2001/0021914 A1 | 9/2001 | Jacobi et al. |
| 2001/0025259 A1 | 9/2001 | Rouchon |
| 2002/0052207 A1 | 5/2002 | Hunzinger |
| 2002/0052674 A1 | 5/2002 | Chang et al. |
| 2002/0052873 A1 | 5/2002 | Delgado et al. |
| 2002/0082901 A1 | 6/2002 | Dunning et al. |
| 2002/0087382 A1 | 7/2002 | Tiburcio |
| 2002/0103796 A1 | 8/2002 | Hartley |
| 2002/0108112 A1 | 8/2002 | Wallace et al. |
| 2002/0116533 A1 | 8/2002 | Holliman et al. |
| 2002/0138836 A1 | 9/2002 | Zimmerman |
| 2002/0165793 A1 | 11/2002 | Brand et al. |
| 2002/0178057 A1 | 11/2002 | Bertram et al. |
| 2002/0194325 A1 | 12/2002 | Chmaytelli et al. |
| 2003/0001907 A1 | 1/2003 | Bergsten et al. |
| 2003/0005074 A1 | 1/2003 | Herz et al. |
| 2003/0014407 A1 | 1/2003 | Blatter et al. |
| 2003/0018799 A1 | 1/2003 | Eyal |
| 2003/0046399 A1 | 3/2003 | Boulter et al. |
| 2003/0055516 A1 | 3/2003 | Gang et al. |
| 2003/0055657 A1 | 3/2003 | Yoshida et al. |
| 2003/0066068 A1 | 4/2003 | Gutta et al. |
| 2003/0069806 A1 | 4/2003 | Konomi et al. |
| 2003/0084044 A1 | 5/2003 | Simpson et al. |
| 2003/0084086 A1 | 5/2003 | Simpson et al. |
| 2003/0084151 A1 | 5/2003 | Simpson et al. |
| 2003/0089218 A1 | 5/2003 | Gang et al. |
| 2003/0097186 A1 | 5/2003 | Gutta et al. |
| 2003/0115167 A1 | 6/2003 | Sharif et al. |
| 2003/0135513 A1 | 7/2003 | Quinn et al. |
| 2003/0149581 A1 | 8/2003 | Chaudhri et al. |
| 2003/0149612 A1 | 8/2003 | Berghofer et al. |
| 2003/0153338 A1 | 8/2003 | Herz et al. |
| 2003/0160770 A1 | 8/2003 | Zimmerman |
| 2003/0191753 A1 * | 10/2003 | Hoch ................ 707/3 |
| 2003/0229537 A1 | 12/2003 | Dunning et al. |
| 2003/0232614 A1 | 12/2003 | Squibbs |
| 2003/0236582 A1 | 12/2003 | Zamir et al. |
| 2003/0237093 A1 | 12/2003 | Marsh |
| 2004/0003392 A1 | 1/2004 | Trajkovic et al. |
| 2004/0019497 A1 | 1/2004 | Volk et al. |
| 2004/0034441 A1 | 2/2004 | Eaton et al. |
| 2004/0073919 A1 | 4/2004 | Gutta |
| 2004/0088271 A1 | 5/2004 | Cleckler |
| 2004/0091235 A1 | 5/2004 | Gutta |
| 2004/0107821 A1 | 6/2004 | Alcalde et al. |
| 2004/0128286 A1 | 7/2004 | Yasushi et al. |
| 2004/0133657 A1 | 7/2004 | Smith et al. |
| 2004/0133908 A1 | 7/2004 | Smith et al. |
| 2004/0133914 A1 | 7/2004 | Smith et al. |
| 2004/0162783 A1 | 8/2004 | Gross |
| 2004/0162830 A1 | 8/2004 | Shirwadkar et al. |
| 2004/0181540 A1 | 9/2004 | Jung et al. |
| 2004/0186733 A1 | 9/2004 | Loomis et al. |
| 2004/0199527 A1 | 10/2004 | Morain et al. |
| 2004/0215793 A1 | 10/2004 | Ryan et al. |
| 2004/0216108 A1 | 10/2004 | Robbin |
| 2004/0224638 A1 | 11/2004 | Fadell et al. |
| 2004/0252604 A1 | 12/2004 | Johnson et al. |
| 2004/0254911 A1 | 12/2004 | Grasso et al. |
| 2004/0260778 A1 | 12/2004 | Banister et al. |
| 2004/0267604 A1 | 12/2004 | Gross |
| 2005/0020223 A1 | 1/2005 | Ellis et al. |
| 2005/0021420 A1 | 1/2005 | Michelitsch et al. |
| 2005/0021678 A1 | 1/2005 | Simyon et al. |
| 2005/0022239 A1 | 1/2005 | Meuleman |
| 2005/0026559 A1 | 2/2005 | Khedouri |
| 2005/0038819 A1 | 2/2005 | Hicken et al. |
| 2005/0038876 A1 | 2/2005 | Chaudhuri |
| 2005/0060264 A1 | 3/2005 | Schrock et al. |
| 2005/0060666 A1 | 3/2005 | Hoshino et al. |
| 2005/0065976 A1 | 3/2005 | Holm et al. |
| 2005/0071418 A1 | 3/2005 | Kjellberg et al. |
| 2005/0091107 A1 | 4/2005 | Blum |
| 2005/0120053 A1 | 6/2005 | Watson |
| 2005/0125221 A1 | 6/2005 | Brown et al. |

(56) References Cited

U.S. PATENT DOCUMENTS

| | | |
|---|---|---|
| 2005/0125222 A1 | 6/2005 | Brown et al. |
| 2005/0131866 A1 | 6/2005 | Badros |
| 2005/0138198 A1 | 6/2005 | May |
| 2005/0154608 A1 | 7/2005 | Paulson et al. |
| 2005/0154764 A1 | 7/2005 | Riegler et al. |
| 2005/0154767 A1 | 7/2005 | Sako |
| 2005/0158028 A1 | 7/2005 | Koba |
| 2005/0166245 A1 | 7/2005 | Shin et al. |
| 2005/0197961 A1 | 9/2005 | Miller et al. |
| 2005/0228830 A1 | 10/2005 | Plastina et al. |
| 2005/0246391 A1 | 11/2005 | Gross |
| 2005/0251455 A1 | 11/2005 | Boesen |
| 2005/0251807 A1 | 11/2005 | Weel |
| 2005/0256756 A1 | 11/2005 | Lam et al. |
| 2005/0256866 A1 | 11/2005 | Lu et al. |
| 2005/0267944 A1 | 12/2005 | Little, II |
| 2005/0278377 A1 | 12/2005 | Mirrashidi et al. |
| 2005/0278758 A1* | 12/2005 | Bodlaender ............... 725/89 |
| 2005/0286546 A1 | 12/2005 | Bassoli et al. |
| 2005/0289236 A1 | 12/2005 | Hull et al. |
| 2006/0004640 A1 | 1/2006 | Swierczek |
| 2006/0004704 A1 | 1/2006 | Gross |
| 2006/0008256 A1 | 1/2006 | Khedouri et al. |
| 2006/0010167 A1 | 1/2006 | Grace et al. |
| 2006/0015378 A1 | 1/2006 | Mirrashidi et al. |
| 2006/0020662 A1 | 1/2006 | Robinson |
| 2006/0026048 A1 | 2/2006 | Kolawa et al. |
| 2006/0048059 A1 | 3/2006 | Etkin |
| 2006/0053080 A1 | 3/2006 | Edmonson et al. |
| 2006/0064716 A1 | 3/2006 | Sull et al. |
| 2006/0074750 A1 | 4/2006 | Clark et al. |
| 2006/0083119 A1 | 4/2006 | Hayes |
| 2006/0085383 A1 | 4/2006 | Mantle et al. |
| 2006/0100924 A1 | 5/2006 | Tevanian, Jr. |
| 2006/0126135 A1 | 6/2006 | Stevens et al. |
| 2006/0130120 A1 | 6/2006 | Brandyberry et al. |
| 2006/0143236 A1 | 6/2006 | Wu |
| 2006/0156242 A1 | 7/2006 | Bedingfield |
| 2006/0167991 A1 | 7/2006 | Heikes et al. |
| 2006/0173910 A1 | 8/2006 | McLaughlin |
| 2006/0174277 A1 | 8/2006 | Sezan et al. |
| 2006/0190616 A1 | 8/2006 | Mayerhofer et al. |
| 2006/0195479 A1 | 8/2006 | Spiegelman et al. |
| 2006/0195512 A1 | 8/2006 | Rogers et al. |
| 2006/0195513 A1 | 8/2006 | Rogers et al. |
| 2006/0195514 A1 | 8/2006 | Rogers et al. |
| 2006/0195515 A1 | 8/2006 | Beaupre et al. |
| 2006/0195516 A1 | 8/2006 | Beaupre |
| 2006/0195521 A1 | 8/2006 | New et al. |
| 2006/0195789 A1 | 8/2006 | Rogers et al. |
| 2006/0195790 A1 | 8/2006 | Beaupre et al. |
| 2006/0200435 A1 | 9/2006 | Flinn et al. |
| 2006/0206582 A1 | 9/2006 | Finn |
| 2006/0218187 A1 | 9/2006 | Plastina et al. |
| 2006/0224757 A1 | 10/2006 | Fang et al. |
| 2006/0227673 A1 | 10/2006 | Yamashita et al. |
| 2006/0242201 A1 | 10/2006 | Cobb et al. |
| 2006/0247980 A1 | 11/2006 | Mirrashidi et al. |
| 2006/0248209 A1 | 11/2006 | Chiu et al. |
| 2006/0253417 A1 | 11/2006 | Brownrigg et al. |
| 2006/0259355 A1 | 11/2006 | Farouki et al. |
| 2006/0265409 A1 | 11/2006 | Neumann et al. |
| 2006/0265503 A1 | 11/2006 | Jones et al. |
| 2006/0265637 A1 | 11/2006 | Marriott et al. |
| 2006/0271959 A1 | 11/2006 | Jacoby et al. |
| 2006/0271961 A1 | 11/2006 | Jacoby et al. |
| 2006/0273155 A1 | 12/2006 | Thackston |
| 2006/0277098 A1 | 12/2006 | Chung et al. |
| 2006/0282304 A1 | 12/2006 | Bedard et al. |
| 2006/0282776 A1 | 12/2006 | Farmer et al. |
| 2006/0282856 A1 | 12/2006 | Errico et al. |
| 2006/0288041 A1 | 12/2006 | Plastina et al. |
| 2006/0293909 A1 | 12/2006 | Miyajima et al. |
| 2007/0005793 A1 | 1/2007 | Miyoshi et al. |
| 2007/0008927 A1 | 1/2007 | Herz et al. |
| 2007/0014536 A1 | 1/2007 | Hellman |
| 2007/0022437 A1 | 1/2007 | Gerken |
| 2007/0028171 A1 | 2/2007 | MacLaurin |
| 2007/0043766 A1 | 2/2007 | Nicholas et al. |
| 2007/0044010 A1 | 2/2007 | Sull et al. |
| 2007/0064626 A1 | 3/2007 | Evans |
| 2007/0078714 A1 | 4/2007 | Ott, IV et al. |
| 2007/0078832 A1 | 4/2007 | Ott, IV et al. |
| 2007/0079352 A1 | 4/2007 | Klein, Jr. |
| 2007/0083471 A1 | 4/2007 | Robbin et al. |
| 2007/0083553 A1 | 4/2007 | Minor |
| 2007/0083929 A1 | 4/2007 | Sprosts et al. |
| 2007/0094081 A1 | 4/2007 | Yruski et al. |
| 2007/0094082 A1 | 4/2007 | Yruski et al. |
| 2007/0094083 A1 | 4/2007 | Yruski et al. |
| 2007/0094363 A1 | 4/2007 | Yruski et al. |
| 2007/0100904 A1 | 5/2007 | Casey et al. |
| 2007/0106672 A1 | 5/2007 | Sighart et al. |
| 2007/0106693 A1 | 5/2007 | Houh et al. |
| 2007/0118425 A1 | 5/2007 | Yruski et al. |
| 2007/0118657 A1 | 5/2007 | Kreitzer et al. |
| 2007/0118802 A1 | 5/2007 | Gerace et al. |
| 2007/0118853 A1 | 5/2007 | Kreitzer et al. |
| 2007/0118873 A1 | 5/2007 | Houh et al. |
| 2007/0130008 A1 | 6/2007 | Brown et al. |
| 2007/0130012 A1 | 6/2007 | Yruski et al. |
| 2007/0152502 A1 | 7/2007 | Kinsey et al. |
| 2007/0162502 A1 | 7/2007 | Thomas et al. |
| 2007/0195373 A1 | 8/2007 | Singh |
| 2007/0198485 A1 | 8/2007 | Ramer et al. |
| 2007/0199014 A1 | 8/2007 | Clark et al. |
| 2007/0214182 A1 | 9/2007 | Rosenberg |
| 2007/0214259 A1 | 9/2007 | Ahmed et al. |
| 2007/0220081 A1 | 9/2007 | Hyman |
| 2007/0233736 A1 | 10/2007 | Xiong et al. |
| 2007/0238427 A1 | 10/2007 | Kraft et al. |
| 2007/0239724 A1 | 10/2007 | Ramer et al. |
| 2007/0244880 A1 | 10/2007 | Martin et al. |
| 2007/0245245 A1 | 10/2007 | Blue et al. |
| 2007/0264982 A1 | 11/2007 | Nguyen et al. |
| 2007/0265870 A1 | 11/2007 | Song et al. |
| 2007/0269169 A1 | 11/2007 | Stix et al. |
| 2007/0277202 A1 | 11/2007 | Lin et al. |
| 2007/0288546 A1 | 12/2007 | Rosenberg |
| 2007/0299873 A1 | 12/2007 | Jones et al. |
| 2007/0299874 A1 | 12/2007 | Neumann et al. |
| 2007/0299978 A1 | 12/2007 | Neumann et al. |
| 2008/0005179 A1 | 1/2008 | Friedman et al. |
| 2008/0010372 A1 | 1/2008 | Khedouri et al. |
| 2008/0016098 A1 | 1/2008 | Frieden et al. |
| 2008/0016205 A1 | 1/2008 | Svendsen |
| 2008/0032723 A1 | 2/2008 | Rosenberg |
| 2008/0033959 A1 | 2/2008 | Jones |
| 2008/0040313 A1 | 2/2008 | Schachter |
| 2008/0046948 A1 | 2/2008 | Verosub |
| 2008/0052371 A1 | 2/2008 | Partovi et al. |
| 2008/0052630 A1 | 2/2008 | Rosenbaum |
| 2008/0059576 A1 | 3/2008 | Liu et al. |
| 2008/0091771 A1 | 4/2008 | Allen et al. |
| 2008/0120501 A1 | 5/2008 | Jannink et al. |
| 2008/0133601 A1 | 6/2008 | Martin Cervera et al. |
| 2008/0133763 A1 | 6/2008 | Clark et al. |
| 2008/0134039 A1 | 6/2008 | Fischer et al. |
| 2008/0134043 A1 | 6/2008 | Georgis et al. |
| 2008/0134053 A1 | 6/2008 | Fischer |
| 2008/0141136 A1 | 6/2008 | Ozzie et al. |
| 2008/0147482 A1 | 6/2008 | Messing et al. |
| 2008/0147711 A1 | 6/2008 | Spiegelman et al. |
| 2008/0147876 A1 | 6/2008 | Campbell et al. |
| 2008/0160983 A1 | 7/2008 | Poplett et al. |
| 2008/0176562 A1 | 7/2008 | Howard |
| 2008/0181536 A1 | 7/2008 | Linden |
| 2008/0189391 A1 | 8/2008 | Koberstein et al. |
| 2008/0189655 A1 | 8/2008 | Kol |
| 2008/0195657 A1 | 8/2008 | Naaman et al. |
| 2008/0195664 A1 | 8/2008 | Maharajh et al. |
| 2008/0208823 A1 | 8/2008 | Hicken |
| 2008/0235632 A1 | 9/2008 | Holmes |
| 2008/0242221 A1 | 10/2008 | Shapiro et al. |

(56) References Cited

U.S. PATENT DOCUMENTS

| | | | |
|---|---|---|---|
| 2008/0242280 A1 | 10/2008 | Shapiro et al. |
| 2008/0244681 A1 | 10/2008 | Gossweiler et al. |
| 2008/0270561 A1 | 10/2008 | Tang et al. |
| 2008/0276279 A1 | 11/2008 | Gossweiler et al. |
| 2008/0288588 A1 | 11/2008 | Andam et al. |
| 2008/0306826 A1 | 12/2008 | Kramer et al. |
| 2008/0319833 A1 | 12/2008 | Svendsen |
| 2009/0007198 A1 | 1/2009 | Lavender et al. |
| 2009/0042545 A1 | 2/2009 | Avital et al. |
| 2009/0055759 A1 | 2/2009 | Svendsen |
| 2009/0069911 A1 | 3/2009 | Stefik |
| 2009/0069912 A1 | 3/2009 | Stefik |
| 2009/0070350 A1 | 3/2009 | Wang |
| 2009/0077124 A1 | 3/2009 | Spivack et al. |
| 2009/0077220 A1 | 3/2009 | Svendsen et al. |
| 2009/0129671 A1 | 5/2009 | Hu et al. |
| 2010/0031366 A1 | 2/2010 | Knight et al. |

FOREIGN PATENT DOCUMENTS

| | | | |
|---|---|---|---|
| EP | 1536352 A1 | 6/2005 |
| EP | 1835455 A1 | 9/2007 |
| GB | 2372850 A | 9/2002 |
| GB | 2397205 A | 7/2004 |
| JP | 2005-321668 | 11/2005 |
| WO | 01/84353 A3 | 11/2001 |
| WO | 02/21335 A1 | 3/2002 |
| WO | 2004/017178 A2 | 2/2004 |
| WO | 2004/043064 A1 | 5/2004 |
| WO | 2005/026916 A2 | 3/2005 |
| WO | 2005/071571 A1 | 8/2005 |
| WO | 2006/075032 A1 | 7/2006 |
| WO | 2006/126135 A2 | 11/2006 |
| WO | 2007/092053 A1 | 8/2007 |

OTHER PUBLICATIONS

Jeff Mascia et al., "Lifetrak: Music in Tune With Your Life," copyright 2006, 11 pages.

Jun Wang et al., "Music Recommender System for Wi-Fi Walkman," Delft University of Technology, 23 pages.

"Amazon.com: Online Shopping for Electronics, Apparel, Computers, Books, DVDs & m . . . ," http://www.amazon.com/, copyright 1996-2007 Amazon.com, Inc., printed Oct. 26, 2007, 4 pages.

"Apple—iPod classic," http://www.apple.com/ipodclassic/, printed Oct. 26, 2007, 1 page.

"BetterPropaganda—Free MP3s and music videos.," http://www.betterpropaganda.com/, copyright 2004-2005 betterPropaganda, printed Feb. 7, 2007, 4 pages.

"Billboard.biz—Music Business—Billboard Charts—Album Sales—Concert Tours," http://www.billboard.biz/bbbiz/index.jsp, copyright 2007 Nielsen Business Media, Inc., printed Oct. 26, 2007, 3 pages.

"Bluetooth.com—Learn," http://www.bluetooth.com/Bluetooth/Learn/, copyright 2007 Bluetooth SIG, Inc., printed Oct. 26, 2007, 1 page.

"ChoiceStream Technology Brief, Review of Personalization Technologies: Collaborative Filtering vs. ChoiceStream's Attributized Bayesian Choice Modeling," 13 pages.

"The Classic TV Database—Your Home for Classic TV!—www.classic-tv.com," http://www.classic-tv.com, copyright The Classic TV Database—www.classic-tv.com, printed Feb. 7, 2007, 3 pages.

"Digital Tech Life >> Download of the Week," http://www.digitaltechlife.com/category/download-of-the-week/, printed Feb. 16, 2007, 9 pages.

"MP3 music download website, eMusic," http://www.emusic.com/, copyright 2007 eMusic.com Inc., printed Feb. 7, 2007, 1 page.

"GenieLab::Music Recommendation System," http://web.archive.org/web/20060813000442/http://genielab.com/, copyright 2005 GenieLab, LLC, printed Oct. 26, 2007, 1 page.

"The Daily Barometer—GenieLab.com grants music lovers' wishes, http://media.barometer.orst.edu/home/index.cfm?event=displayArticlePrinterFriendly&uSt . . . ," copyright 2007 The Daily Barometer, printed Feb. 16, 2007, 2 pages.

"Gracenote Playlist," Revised Dec. 29, 2005, 2 pages.

"Gracenote Playlist Plus," Revised Dec. 29, 2005, 2 pages.

"Gracenote," http://www.gracenote.com, printed Feb. 7, 2007, 1 page.

"IEEE 802.11—Wikipedia, the free encyclopedia," http://en.wikipedia.org/wiki/IEEE_802.11, printed Oct. 26, 2007, 5 pages.

"ILikeTM—Home," http://www.ilike.com/, copyright 2007 iLike, printed May 17, 2007, 2 pages.

"The Internet Movie Database (IMDb)," http://www.imdb.com/, copyright 1990-2007 Internet Movie Database Inc., printed Feb. 7, 2007, 3 pages.

"Apple—iPod + iTunes," http://www.apple.com/itunes/, copyright 2007 Paramount Pictures, printed Feb. 7, 2007, 2 pages.

"Last.fm the social music revolution," 1 page.

"Last.fm—Wikipedia, the free encyclopedia," http://en.wikipedia.org/wiki/Last.fm, printed Aug. 8, 2006, 7 pages.

"LimeWire—Wikipedia, the free encyclopedia," http://en.wikipedia.org/wiki/LimeWire, printed Aug. 8, 2006, 2 pages.

"Liveplasma music, movies, search engine and discovery engine," http://www.liveplasma.com, printed May 17, 2007, 1 page.

"Loomia—Personalized Recommendations for Media, Content and Retail Sites," http://www.loomia.com/, copyright 2006-2007 Loomia Inc., printed Feb. 7, 2007, 2 pages.

"Mercora—Music Search and Internet Radio Network," http://www.mercora.com/overview.asp, copyright 2004-2006 Mercora, Inc., printed Aug. 8, 2006, 1 page.

"Mercora—Music Search and Internet Radio Network," http://www.mercora.com/v6/_front/web.jsp, printed Feb. 7, 2007, 1 page.

"Welcome to the MUSICMATCH Guide," http://www.mmguide.musicmatch.com/, copyright 2001-2004 Musicmatch, Inc., printed Feb. 7, 2007, 1 page.

"Mongomusic.com—The Best Download mp3 Resources and Information. This website is for sale!," http://www.mongomusic.com/, printed May 17, 2007, 2 pages.

"Take a look at the Future of Mobile Music :: MUSIC GURU," http://www.symbian-freak.com/news/006/02/music_guru.htm, copyright 2005 Symbian freak, printed Feb. 7, 2007, 3 pages.

"Music Recommendations 1.0—MacUpdate," http://www.macupdate.com/info.php/id/19575, printed Feb. 16, 2007, 1 page.

"MusicGremlin," http://www.musicgremlin.com/StaticContent.aspx?id=3, copyright 2005, 2006, 2007 MusicGremlin, Inc., printed Oct. 26, 2007, 1 page.

"MusicIP—The Music Search Engine," http://www.musicip.com/, copyright 2006-2007 MusicIP Corporation, printed Feb. 7, 2007, 1 page.

"Digital Music News," http://www.digitalmusicnews.com/results?title=musicstrands, copyright 2003-6 Digital Music News, printed Aug. 8, 2006, 5 pages.

"Musicstrands.com Because Music is Social," copyright 2006 MusicStrands, Inc., 2 pages.

"MyStrands for Windows 0.7.3 Beta," copyright 2002-2006 ShareApple.com networks, printed Jul. 16, 2007, 3 pages.

"MyStrands for Windows Change Log," http://www.mystrands.com/mystrands/windows/changelog.vm, printed Jul. 16, 2007, 6 pages.

"MyStrands Download," http://www.mystrands.com/overview.vm, printed Feb. 7, 2007, 3 pages.

"Napster—All the Music You Want," http://www.napster.com/using_napster/all_the_music_you_want.html, copyright 2003-2006 Napster, LLC, printed Feb. 7, 2007, 2 pages.

"Try Napster free for 7 Days—Play and download music without paying per song.," http://www.napster.com/choose/index.html, copyright 2003-2007 Napster, LLC, printed Feb. 7, 2007, 1 page.

"FAQ," http://blog.pandora.com/faq/, copyright 2005-2006 Pandora Media, Inc., printed Aug. 8, 2006, 20 pages.

"Pandora Internet Radio—Find New Music, Listen to Free Web Radio," http://www.pandora.com/, copyright 2005-2007 Pandora Media, Inc., printed Feb. 7, 2007, 1 page.

(56) References Cited

OTHER PUBLICATIONS

"Pandora Radio—Listen to Free Internet Radio, Find New Music," http://www.pandora.com/mgp, copyright 2005-2007 Pandora Media, Inc., printed Oct. 26, 2007, 1 page.
"Rhapsody—Full-length music, videos and more—FREE," http://www.rhapsody.com/welcome.html, copyright 2001-2007 Listen.com, printed Feb. 7, 2007, 1 page.
Badrul M. Sarwar et al., "Recommender Systems for Large-scale E-Commerce: Scalable Neighborhood Formation Using Clustering," 2002, 6 pages.
"Soundflavor," http://www.soundflavor.com/, copyright 2003-2007 Soundflavor, Inc., printed Feb. 7, 2007, 1 page.
"That canadian girl >> Blog Archive >> GenieLab," http://www.thatcanadiangirl.co.uk/blog/2005/02/22/genielab/, copyright 2007 Vero Pepperrell, printed Feb. 16, 2007, 3 pages.
"UpTo11.net—Music Recommendations and Search," http://www.upto11.net/, copyright 2005-2006 Upto11.net, printed Feb. 7, 2007, 1 page.
"Webjay—Playlist Community," http://www.webjay.org/, copyright 2006 Yahoo! Inc., printed Feb. 7, 2007, 5 pages.
"Wired News:," http://www.wired.com/news/digiwoo/1,57634-0.html, copyright 2005 Lycos, Inc., printed Oct. 9, 2006, 3 pages.
"Yahoo! Messenger—Chat, Instant message, SMS, PC Calls and More," http://messenger.yahoo.com/webmessengerpromo.php, copyright 2007 Yahoo! Inc., printed Oct. 26, 2007, 1 page.
"Yahoo Music Jukebox—Wikipedia, the free encyclopedia," http://en.wikipedia.org/wiki/Yahoo_music_engine, printed Aug. 8, 2006, 1 page.
"Music Downloads—Over 2 Million Songs—Try It Free—Yahoo! Music," http://music.yahoo.com/ymu/default.asp, copyright 2006 Yahoo! Inc., printed Feb. 7, 2007, 1 page.
"YouTube—Broadcast Yourself.," http://www.youtube.com/, copyright 2007 YouTube, LLC, printed Oct. 26, 2007, 2 pages.
"Instant Messenger—AIM—Instant Message Your Online Buddies for Free—AIM," http://dashboard.aim.com/aim, copyright 2007 AOL LLC, printed Nov. 8, 2007, 6 pages.
"Outlook Home Page—Microsoft Office Online," http://office.microsoft.com/en-us/outlook/default.aspx, copyright 2007 Microsoft Corporation, printed Nov. 8, 2007, 1 page.
"Thunderbird—Reclaim your inbox," http://www.mozilla.com/en-US/thunderbird/, copyright 2005-2007 Mozilla, printed Nov. 8, 2007, 2 pages.
"RYM FAQ—Rate Your Music," http://rateyourmusic.com/faq/, copyright 2000-2007 rateyourmusic.com, printed Nov. 8, 2007, 14 pages.
"Trillian (software)—Wikipedia, the free encyclopedia," http://en.wikipedia.org/wiki/Trillian_(instant_messenger), printed Nov. 8, 2007, 11 pages.
"Not safe for work—Wikipedia, the free encyclopedia," http://en.wikipedia.org/wiki/Work_safe, printed Nov. 8, 2007, 2 pages.
"Zune.net—How-To-Share Audio Files Zune to Zune," http://web.archive.org/web/20070819121705/http://www.zune.net/en-us/support/howto/z . . . , copyright 2007 Microsoft Corporation, printed Nov. 14, 2007, 2 pages.
"LAUNCHcast Radio-13 Yahoo! Messenger," http://messenger.yahoo.com/launch.php, copyright 2007 Yahoo! Inc., printed Nov. 8, 2007, 1 page.
"Ringo: Social Information Filtering for Music Recommendation," http://jolomo.net/ringo.html, printed Aug. 3, 2009, 1 page.
"Tours Profile," http://mog.com/Tour, copyright 2006-2009 Mog Inc., printed Aug. 3, 2009, 11 pages.
Barrie-Anthony, Steven, "That song sounds familiar," Los Angeles Times, Feb. 3, 2006, available from http://www.calendarlive.com/printedition/calendar/cl-et-pandora3feb03,0,7458778.story?track=tottext,0,19432.story?track=tothtml, 5 pages.
"How many songs are in your iTunes Music library (or libraries in total, if you use more than one)?," http://www.macoshints.com/polls/index.php?pid=itunesmusiccount, printed Feb. 24, 2010, copyright 2010 Mac Publishing LLC, 10 pages.
Huang, Yao-Chang et al., "An Audio Recommendation System Based on Audio Signature Description Scheme in MPEG-7 Audio," IEEE International Conference on Multimedia and Expo (ICME), copyright 2004 IEEE, pp. 639-642.
"Hulu—About," www.hulu.com/about/product_tour, copyright 2010 Hulu LLC, printed Jun. 15, 2010, 2 pages.
"Identifying iPod models," http://support.apple.com/kb/HT1353, printed Feb. 24, 2010, 13 pages.
Kosugi, Naoko et al., "A Practical Query-By-Humming System for a Large Music Database," Oct. 2000, International Multimedia Conference, Proceedings of the 8th ACM International Conference on Multimedia, copyright 2000 ACM, pp. 333-342.
Mitchell, Bradley, "Cable Speed—How Fast is Cable Modem Internet?," http://www.compnetworking.about.com/od/internetaccessbestuses/f/cablespeed.htm, printed Feb. 24, 2010, 2 pages.
Nilson, Martin, "id3v2.4.0-frames—ID3.org," http://www.id3.org/id3v2.4.0-frames, Nov. 1, 2000, copyright 1998-2009, printed Jun. 15, 2010, 31 pages.
"Songbird," http://getsongbird.com/, copyright 2010 Songbird, printed Jun. 15, 2010, 2 pages.
"SongReference," http://songreference.com/, copyright 2008, SongReference.com, printed Jun. 15, 2010, 1 page.
"What is the size of your physical and digital music collection?," http://www.musicbanter.com/general-music/47403-what-size-your-physical-digital-music-collection-12.html, printed Feb. 24, 2010, copyright 2010 Advameg, Inc., 6 pages.
Yahoo! Music downloaded archival page from www.archive.org for Jun. 20, 2005, copyright 2005 Yahoo! Inc., 14 pages.

* cited by examiner 43, 43'

"RECOMMENDATION TABLE" (46)

| RECOMMENDATION ID (47) | MEDIA ITEM ID (44) | USER ID (12) | RATING NUMBER (48) | RATING LEVEL (50) |
|---|---|---|---|---|
| 24 | "867-5309" | A | 2 | 5 |
| 108 | "WHIP IT" | B | 2 | 1 |
| ⋮ | ⋮ | ⋮ | ⋮ | ⋮ |

*FIG. 3A*

"RECEIVED RECOMMENDATIONS TABLE" (52)

| RECOMMENDATION ID (47) | RECEIVER ID (54) | RECOMMENDER ID (56) |
|---|---|---|
| 24 | B | A |
| 24 | C | B |
| 108 | C | B |
| 108 | N | C |
| 108 | X | N |
| ⋮ | ⋮ | ⋮ |

"SENT RECOMMENDATIONS TABLE" (170)

| RECOMMENDATION ID (172) | RECOMMENDER ID (174) | RECEIVER ID (176) |
|---|---|---|
| 24 | A | B |
| 24 | B | C |
| 108 | B | C |
| 108 | C | N |
| 108 | N | X |
| ⋮ | ⋮ | ⋮ |

*FIG. 7*

Friends

| Title | Time | Artist | Album | Score | Genre | Year | Received | Played | Recommendation Rating | Recommender |
|---|---|---|---|---|---|---|---|---|---|---|
| >Vicious World | 3:17 | Rufus Wainwright | Want One | | Rock | 2004 | 1:17AM/1may | 1:17AM/1may | 843982 | Jen365 |
| Pretty Things | 4:22 | Rufus Wainwright | Want One | | Rock | 2004 | 1:22AM/1may | 1:22AM/1may | 824322 | Jen365 |
| Let Me Go | 3:33 | Sonya Kitchell | Words Came... | | Pop | 2006 | 2:44AM/1may | 2:44AM/1may | 792418 | Penelope |
| In God's Country | 5:01 | U2 | The Joshua... | | Rock | 1993 | 3:12AM/1may | 3:12AM/1may | 789384 | Michael123 |
| All of My Days | 4:45 | Alexi Murdoch | Time Without... | | Alternative | 2005 | 3:55AM/1may | 3:55AM/1may | 789222 | HughABC |
| Forget About It | 3:21 | Allison Krauss | Forget About It | | Country | 2001 | 4:11AM/1may | 4:11AM/1may | 765198 | GeneTheMan |
| Hypnotized | 4:35 | Ani Difranco | Reprieve | | Alternative | 2006 | 4:35AM/1may | 4:35AM/1may | 719098 | GeneTheMan |
| Studying Stones | 5:12 | Ani Difranco | Knuckle Down | | Alternative | 2005 | 5:12AM/1may | 5:12AM/1may | 522762 | GeneTheMan |
| Strange & Beau | 4:24 | Aqualung | Strange | | Rock | 2006 | 6:44AM/1may | 6:44AM/1may | 538000 | WaymenA |
| Vicious World | 3:17 | Rufus Wainwright | Want One | | Rock | 2004 | 1:17AM/1may | 1:17AM/1may | 514389 | Jen365 |
| Pretty Things | 4:22 | Rufus Wainwright | Want One | | Rock | 2004 | 1:22AM/1may | 1:22AM/1may | 482766 | Jen365 |
| Let Me Go | 3:33 | Sonya Kitchell | Words Came... | | Pop | 2006 | 2:44AM/1may | 2:44AM/1may | 481584 | Penelope |
| In God's Country | 5:01 | U2 | The Joshua... | | Rock | 1993 | 3:12AM/1may | 3:12AM/1may | 453198 | Michael123 |
| All of My Days | 4:45 | Alexi Murdoch | Time Without... | | Alternative | 2005 | 3:55AM/2may | 3:55AM/2may | 432098 | HughABC |
| Forget About It | 3:21 | Allison Krauss | Forget About It | | Country | 2001 | 4:11AM/2may | 4:11AM/2may | 375688 | GeneTheMan |
| Hypnotized | 4:35 | Ani Difranco | Reprieve | | Alternative | 2006 | 4:35AM/2may | 4:35AM/2may | 343299 | GeneTheMan |
| Studying Stones | 5:12 | Ani Difranco | Knuckle Down | | Alternative | 2005 | 5:12AM/2may | 5:12AM/2may | 342846 | GeneTheMan |
| Strange & Beau | 4:24 | Aqualung | Strange | | Rock | 2006 | 6:44AM/2may | 6:44AM/2may | | WaymenA |
| Vicious World | 3:33 | Rufus Wainwright | Want One | | Rock | 2004 | 7:22AM/2may | 7:22AM/2may | | GeneTheMan |

| Title | Time | Artist | Album | Score | Genre | Year | Received | Played | Recommendation Rating | Recommender |
|---|---|---|---|---|---|---|---|---|---|---|
| >Vicious World | 3:17 | Rufus Wainwright | Want One | ■ | Rock | 2004 | 1:17AM/1may | 1:17AM/1may | ★★★★☆ | Jen365 |
| Pretty Things | 4:22 | Rufus Wainwright | Want One | ■ | Rock | 2004 | 1:22AM/1may | 1:22AM/1may | ★★★★★ | Jen365 |
| Let Me Go | 3:33 | Sonya Kitchell | Words Came... | ■ | Pop | 2006 | 2:44AM/1may | 2:44AM/1may | ★★★★★ 50 | Penelope |
| In God's Country | 5:01 | U2 | The Joshua... | ■ | Rock | 1993 | 3:12AM/1may | 3:12AM/1may | ★★★★★ | Michael123 |
| All of My Days | 4:45 | Alexi Murdoch | Time Without... | ■ | Alternative | 2005 | 3:55AM/1may | 3:55AM/1may | ★★★★☆ | HughABC |
| Forget About It | 3:21 | Allison Krauss | Forget About It | ■ | Country | 2001 | 4:11AM/1may | 4:11AM/1may | ★★★★☆ | GeneTheMan |
| Hypnotized | 4:35 | Ani Difranco | Reprieve | ■ | Alternative | 2006 | 4:35AM/1may | 4:35AM/1may | ★★★★☆ | GeneTheMan |
| Studying Stones | 5:12 | Ani Difranco | Knuckle Down | ■ | Alternative | 2005 | 5:12AM/1may | 5:12AM/1may | ★★★★☆ | GeneTheMan |
| Strange & Beau | 4:24 | Aqualung | Strange | ■ | Rock | 2006 | 6:44AM/1may | 6:44AM/1may | ★★★☆ | WaymenA |
| Vicious World | 3:17 | Rufus Wainwright | Want One | ■ | Rock | 2004 | 1:17AM/1may | 1:17AM/1may | ★★★☆ | Jen365 |
| Pretty Things | 4:22 | Rufus Wainwright | Want One | ■ | Rock | 2004 | 1:22AM/1may | 1:22AM/1may | ★★★☆ | Jen365 |
| Let Me Go | 3:33 | Sonya Kitchell | Words Came... | ■ | Pop | 2006 | 2:44AM/1may | 2:44AM/1may | ★★★☆ | Penelope |
| In God's Country | 5:01 | U2 | The Joshua... | ■ | Rock | 1993 | 3:12AM/1may | 3:12AM/1may | ★★★☆ | Michael123 |
| All of My Days | 4:45 | Alexi Murdoch | Time Without... | ■ | Alternative | 2005 | 3:55AM/2may | 3:55AM/2may | ★★★☆ | HughABC |
| Forget About It | 3:21 | Allison Krauss | Forget About It | ■ | Country | 2001 | 4:11AM/2may | 4:11AM/2may | ★★★ | GeneTheMan |
| Hypnotized | 4:35 | Ani Difranco | Reprieve | ■ | Alternative | 2006 | 4:35AM/2may | 4:35AM/2may | ★★ | GeneTheMan |
| Studying Stones | 5:12 | Ani Difranco | Knuckle Down | ■ | Alternative | 2005 | 5:12AM/2may | 5:12AM/2may | ★★ | GeneTheMan |
| Strange & Beau | 4:24 | Aqualung | Strange | ■ | Rock | 2006 | 6:44AM/2may | 6:44AM/2may | ★★★ | WaymenA |
| Vicious World | 3:33 | Rufus Wainwright | Want One | ■ | Rock | 2004 | 7:22AM/2may | 7:22AM/2may | | GeneTheMan |

RATING MEDIA ITEM RECOMMENDATIONS USING RECOMMENDATION PATHS AND/OR MEDIA ITEM USAGE

FIELD OF THE INVENTION

The present invention relates to determining a recommendation rating for a recommended media item based on user recommendation paths and/or usage or play of the media item.

BACKGROUND OF THE INVENTION

In recent years, there has been an enormous increase in the amount of digital media available online. Services, such as Apple's iTunes® for example, enable users to legally purchase and download music. Other services, such as Yahoo!® Music Unlimited and RealNetwork's Rhapsody® for example, provide access to millions of songs for a monthly subscription fee. YouTube® provides users access to video media. As a result, media items have become much more accessible to consumers worldwide. However, the increased accessibility of media has only heightened a long-standing problem for the media industry, which is namely the issue of linking users with media that matches their preferences.

Many companies, technologies, and approaches have emerged to address this issue of media recommendation. Media item recommendations may be provided to users as suggestions based on information about the user and/or their media likes or dislikes, also called preferences. Media recommendations may be provided either by service provider companies or by the user's online "friends" (typically identified by user id). In the case of company provided recommendations, some companies assign ratings to attributes of an identified media that are assembled to create a holistic classification for the media that is then used by a recommendation engine. Other companies take a communal approach wherein recommendations are based on the collective wisdom of a group of users with similar tastes by profiling the habits of a particular user and then searching similar profiles of other users.

When a user receives media recommendations, an associated play or popularity rating may follow. The rating is designed to be indicative of the relative play or usage of the media item among users. This allows the user to organize their media item selections for view and/or usage according to popularity. The popularity rating is typically maintained on a remote server or a super peer device accessible to other users' networked devices. The user can select which of their media is played based on the popularity. The play rating may be updated with the user's own usage of given media items which is reported as an input to the popularity rating algorithm for the media item.

One issue associated with popularity or play ratings is that they are not truly indicative of media item usage as a result of recommendations. The play or usage of a media item may affect its play rating regardless of whether such play or usage was attributable to a recommendation. Thus as an example, a single user playing a given media item one thousand (1000) times may increase the play rating of the media in the same manner as one hundred (100) different users each playing the given media item ten (10) times each. Thus, the play rating can be skewed and even manipulated to artificially increase its popularity by a single or small group of users. One hundred (100) different users playing a media item as a result of recommendations may be more useful information to a user in determining which media item to play. However, it cannot be determined whether a media item's play rating was a result of recommendations, and if so, to what extent.

SUMMARY OF THE INVENTION

The present invention is a media item recommendation rating system and method. A recommendation rating for a media item is established and dynamically updated in response to the media item being recommended to other users. A recommendation server or other device receives a report of a media item recommendation and updates a recommendation rating in response. The recommendation rating may also be updated based on how often media items are used or played in response to a received recommendation. Thus, a media item's recommendation rating is affected by events relating to its recommendation, as opposed to simple play-based ratings that are updated on play actions regardless of whether related to a recommendation or not. Simple play-based ratings do not distinguish between ordinary usages or plays and those resulting from recommendations. Recommendation of a media item to another user is a better indicator of the user's likeability of a media item, since a recommendation is an endorsement of sorts. Many users may be interested or like a media item enough to use or play it, but not enough to recommend it. Uses or plays of media items short of a recommendation do not affect the recommendation rating as provided by the present invention.

In one embodiment, a recommendation server is provided that is operably connected to a network, such as the Internet for example. One or more user devices are coupled to the network. When a user device makes a recommendation for a media item to another user device, a message is sent to a recommendation server, which includes the originating recommender id, the destination, and the id of the media item being recommended. The recommendation server establishes a recommendation rating for the media item if a record of the media item does not already exist in recommendation tables stored in memory. Each unique media item recommended by a user has its own entry and recommendation rating in the recommendation tables. In this manner, and each time a media item is recommended to another user, the recommendation server dynamically updates the recommendation rating for the media item to affect, and in the typical case increase, its rating. After the recommendation rating is either established or updated, the recommendation server may forward the media item recommendation along with the recommendation rating to the recipient. The recipient client may contain a scoring engine that relies on the recommendation and/or other metrics to calculate a recommendation score for the media item, or to sort the recommendations according to their recommendation rating.

The recommendation rating may be altered each time a recommendation path for a given media item is made regardless of whether the recommendation path is a duplicate, or altered based only on new recommendation paths for a given media item. The recommendation server updates one or more recommendation tables to store current and previous recommendation paths for media items between users. This allows the recommendation rating to only be altered based on new recommendation paths for a given media item instead of duplicated recommendation paths for the media item.

The recommendation server may also alter or increase a media item recommendation rating based on the media item being played by another user after receiving the recommendation. In this manner, not only is the recommendation rating affected by number of recommendations made, but the recommendation rating is also based on the effectiveness measured by the recipient's play or usage of the recommended media item. In order to determine if the media item used or played by a user was the result of a previous recommendation, the recommendation tables established and maintained by the recommendation server are consulted. In this manner, it can be determined if a user received the used or played media item as a result of a recommendation. If not, the user is simply playing the media item without the item having been recommended, which is not used to update the recommendation rating. Otherwise, the system would simply just be a play rating system, which is not the intention of the present invention.

The recommendation server may also be responsible for forwarding the recommended media item to the intended recipient user. Alternatively, the recommendation server may simply be responsible for establishing and maintaining the recommendation rating, wherein the actual recommendation of the media item is forwarded between users in another manner, such as through another server or through a peer-to-peer communication.

As an alternative to a recommendation server, a super peer device may be provided to perform some or all of the same aforementioned functionalities of the recommendation server. A super peer device may include a database for storing the recommendation tables and recommendation ratings in memory, or a network recommendation database separate from the super peer device may be provided on a network to provide storage for the recommendation tables and ratings. The super peer device may send and receive recommendations to and from other peer user devices, in addition to receiving reports regarding media item recommendations. Alternatively, the other user devices may send the actual media item recommendations directly to other users in a peer-to-peer communication with a separate reporting message only being communicated to the recommendation server or the super peer device to establish and update the recommendation ratings for media items. The peer recipient may then contact the recommendation server or super peer device, as the case may be, to obtain the recommendation rating for the recommended media item, and to perform such actions as calculate a recommendation score at the recipient client for example, if desired.

The recommendation rating increase may not be the same for each kind of action. It may be desired to weight an increase in the recommendation rating for a media item recommendation more heavily than an increase for play action of recommendations. The same may be true in vice versa. Further, the increase for a recommendation rating could be performed in a non-linear fashion, such as the use of a degrading scale wherein the recommendation rating increase amount becomes less as the number of recommendations and/or play actions for recommended media items increases. The degrading recommendation rating increase method may be performed for play actions for recommended media items, or media item recommendations to other users, or both. The recommendation rating increase could actually convert to a decrease if a recommendation for a media item is never played by a recipient user, or is not played within a certain period of time. Timestamps may be used to track the elapsed time between a recommendation for a media item and its play by a recipient user. A timeout may be used to automatically notify, without requiring a play action trigger, that a recommendation for a media item has not been played with a designated period of time. Alternatively, the elapsed time between plays for recommended media items could be analyzed only after receiving a recommendation or play action for a particular media item. The present invention is not limited to any particular type of increase or decrease system, methodology, or algorithm.

The recommendation rating system and method of the present invention may also be used in an application to assist a user in choosing media items. The recommendations ratings for media items may be accessed for any variety of applications. For example, the recommendation rating may be displayed to a user in a media application running on a user device. The user may select media items to be displayed according to their recommendation rating, with the highest rating appearing first and the lowest rating appearing last, or vice versa. In this manner, the user can make media item selections based on the recommendation rating of the item. This is one example of the possible applications of the present invention.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIGS. 3A and 3B illustrate recommendation tables used to track recommendation paths for media items and associated recommendation ratings for such media items in accordance with one embodiment of the present invention;

FIG. 7 illustrates a "sent recommendations table" that is provided as either an alternative or used in conjunction with a "received recommendations table," to determine if play or usage of a media item is from a recommendation from another user;

FIG. 10 illustrates an example of a media client application executing on a user's device wherein recommendation ratings for media items are accessed and displayed to the user, and wherein the displayed media items are displayed by order of their recommendation rating;

FIG. 11 illustrates an example of a media client application executing on a user's device, wherein an alternative relative recommendation rating score is displayed to the user, and wherein the user's displayed media items are displayed by order of their recommendation rating;

Figure 12:
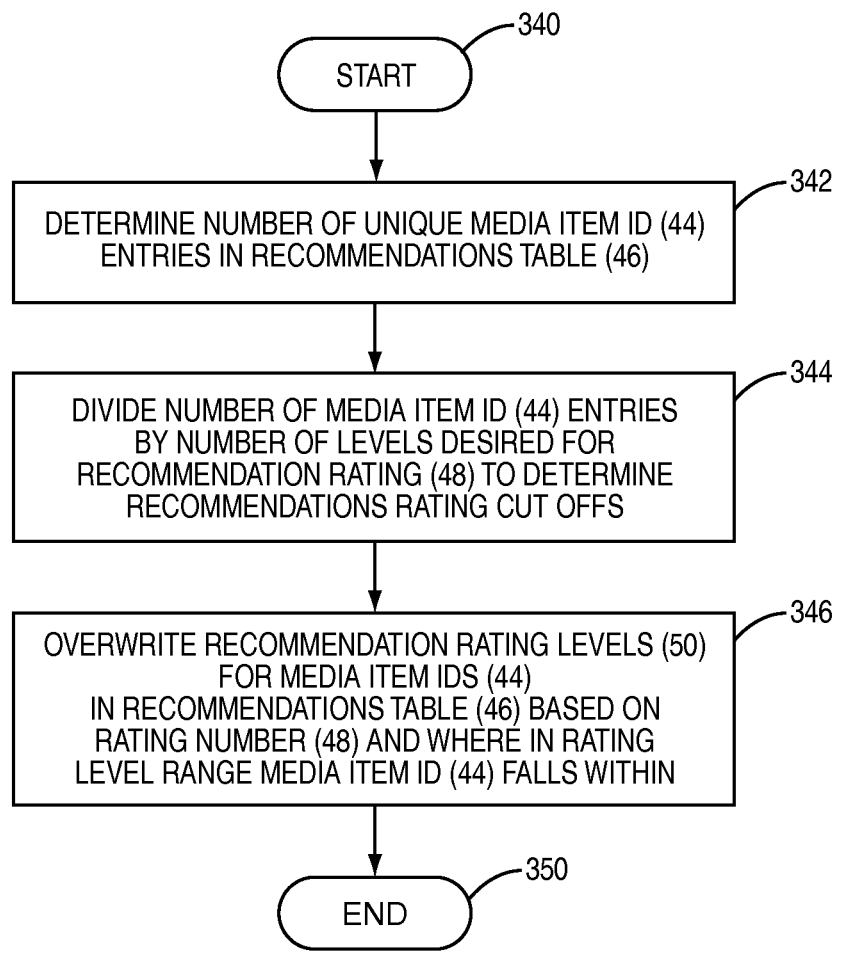
Figure 13:
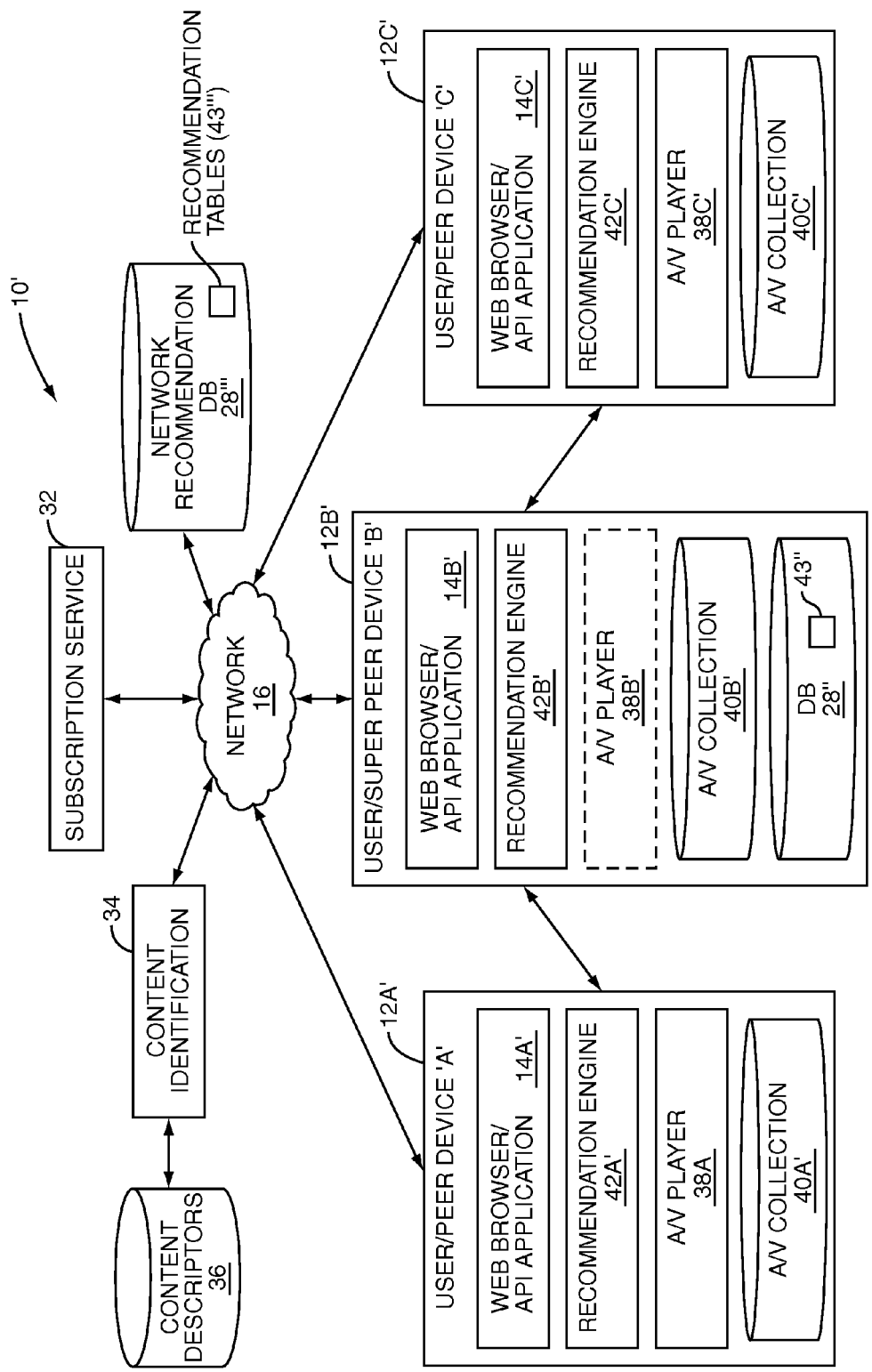

FIG. 12 is an exemplary flow chart illustrating a dynamic relative recommendation rating determination system that may be used to provide a relative recommendation rating for media items in the exemplary media client application illustrated in FIG. 11; and FIG. 13 illustrates an alternative peer-to-peer system for dynamically updating a recommendation rating for media items based on users' recommendations for media items and play of media items received from other users' recommendations.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention is a media item recommendation rating system and method. A recommendation rating for a media item is established and dynamically updated in response to the media item being recommended to other users. A recommendation server or other device receives a report of a media item recommendation and updates a recommendation rating in response. The recommendation rating may also be updated based on how often media items are used or played in response to a received recommendation. Thus, a media item's recommendation rating is affected by events relating to its recommendation, as opposed simple play-based ratings that are updated on play actions regardless of whether related to a recommendation or not. Simple play ratings do not distinguish between ordinary usages or plays and those resulting from recommendations. Recommendation of a media item to another user is a better indicator of the user's likeability of a media item, since a recommendation is an endorsement of sorts. Many users may be interested or like a media item enough to use or play it, but not enough to recommend it. Uses or plays of media items short of a recommendation do not affect the recommendation rating as provided by the present invention.

A recommendation server may be provided that is operably connected to a network, such as the Internet for example. One or more user devices are coupled to the network. When a user device makes a recommendation for a media item to another user device, a message is sent to a recommendation server, which includes the originating recommender id, the destination, and the id of the media item being recommended. The recommendation server establishes a recommendation rating for the media item if a record of the media item does not already exist in recommendation tables stored in memory. Each unique media item recommended by a user has its own entry and recommendation rating in the recommendation tables. In this manner, and each time a media item is recommended to another user, the recommendation server dynamically updates the recommendation rating for the media item to affect, and in the typical case increase, its rating. After the recommendation rating is either established or updated, the recommendation server may forward the media item recommendation along with the recommendation rating to the recipient. The recipient client may contain a scoring engine that relies on the recommendation and/or other metrics to calculate a recommendation score for the media item, or to sort the recommendations according to their recommendation rating.

Figure 1:
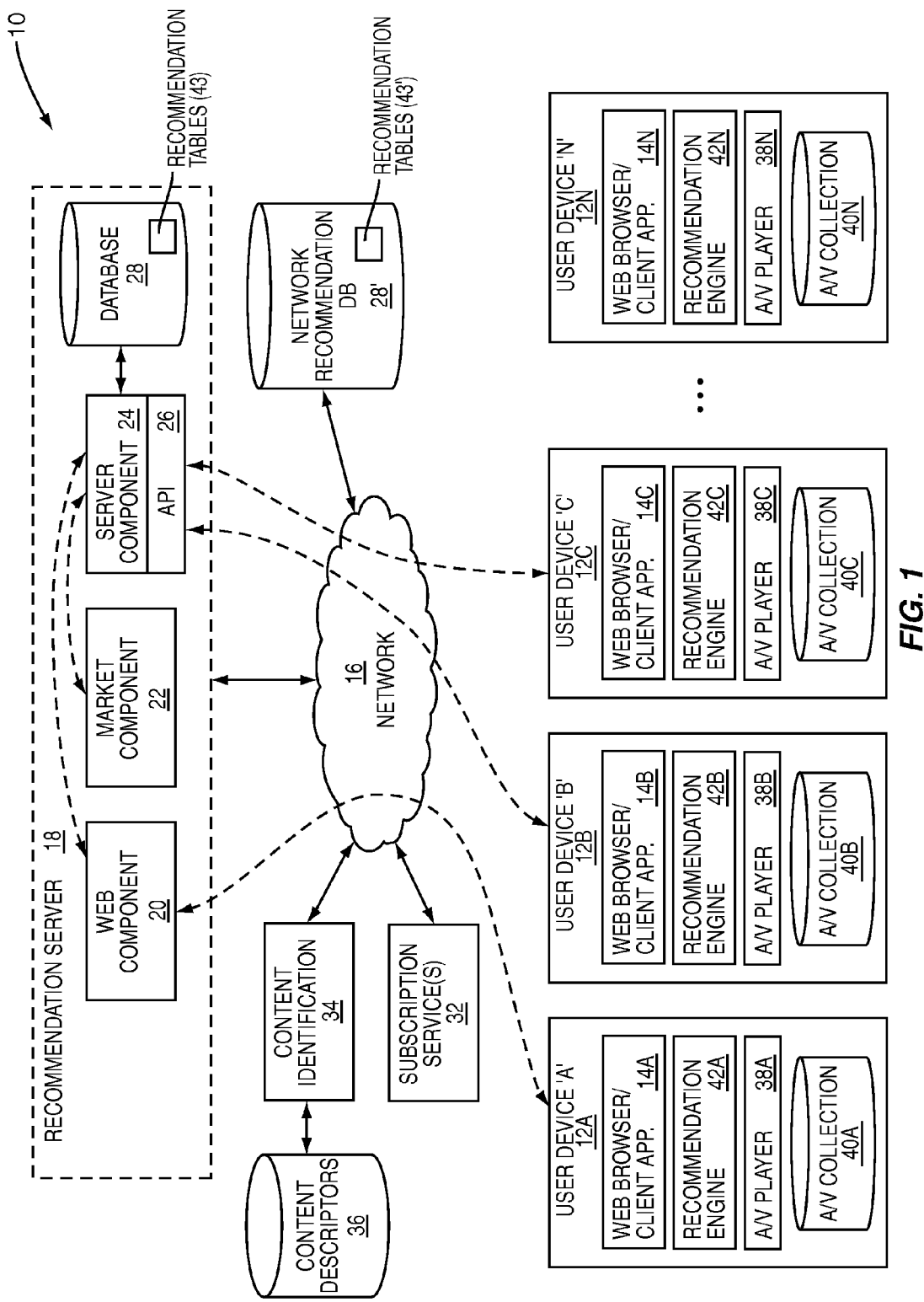
FIG. 1 illustrates a user-server system for dynamically updating a recommendation rating for media items based on users' recommendations for media items and use or play of media items received from other users' recommendations.

In this regard, FIG. 1 illustrates an exemplary media item recommendation system 10 for establishing and maintaining media item recommendation ratings according to the present invention. One or more user devices 12 are illustrated as networked computing devices employed by a user to use and/or play media items. FIG. 1 illustrates a plurality of user devices 12, namely user devices 12A, 12B, 12C, and up through including any number of user devices to 12N. Media items can be any type of media file or information, including but not limited to audio files, video files, songs, music, etc. The user devices 12 are what users or consumers control to provide recommendations of media items to other users as well as using or playing media items received as recommendations from other users. As discussed above and as discussed throughout the remainder of this application, both recommendations to others and usage or play of media items received as recommendations can affect the recommendation rating of a media item.

The user devices 12 typically contain a web browser and/or client application 14 to provide a graphical user interface to the user. The web browser or client application 14 can establish a connection over a network 16, such as the Internet, a TCP-IP based network, to a recommendation server 18. The recommendation server 18 can be any type of computing device that is coupled to the network 16 and is adapted to provide media related services to user devices 12. Examples of user devices 12 that may be used to access the recommendation server 18 and/or other users over the network 16 include, but are not limited to, personal computers, wireless portable media players (PMPs), personal digital assistants (PDAs), and the like. In general, the peer device 12 includes a control system having associated memory. The peer device 12 also includes a storage unit. The storage unit may be any number of digital storage devices such as, for example, one or more hard-disc drives, one or more memory cards, RAM, one or more external digital storage devices, or the like. The peer device 12 also includes a communication interface. The peer device 12 may also include a user interface, which may include components such as a display, speakers, a user input device, and the like.

The recommendation server 18 may be comprised of several components to facilitate user connections and provide media related services. These components may be comprised of a web component 20, a market component 22, and a server component 24. The server component 24 may also provide an application program interface (API) 26 to provide a downloadable client application to the user devices 12 for interfacing, ordering, and receiving media related services from the recommendation server 18 after an initial session is established between a user device 12 and the server 18 via the web browser 14, for example. A database 28 may be located on location at the recommendation server 18 for storage of data, including but not limited to media items and information relating to recommendation ratings for media items. A network accessible database 28' may also be utilized to provide storage capabilities remote from the recommendation server 18 and/or as backup data storage, if desired.

Some media items requested or needing to be accessed may not be stored locally in the recommendation server's database 28 or network database 28', but rather obtained from subscription services via network 16 access on-demand. In this regard, network accessible subscription services 32 may be provided for user devices 12 to access media items for downloading. The recommendation server 18 and/or the user devices 12 may access the subscription services 32 over the network 16.

Further, the recommendation server 18 and/or the user devices 12 can communicate over the network 16 with content identification systems 34 to provide identifying and other characteristic information about media items, such as information regarding artists, song titles, genre, etc. in the example of song content in particular. The allows access to user friendly information about media items as part of the services provided by the recommendation server 18 and/or the user devices 12. The identification systems 34 may be coupled with or contain content descriptors 36 that are compared to media items to identify and provide information regarding media items. For an example of songs in particular, the descriptors 36 may include known fingerprints and/or Global Unique IDs (GUIDs) to identify songs and obtain metadata containing information about the songs, such as title, artist, genre, etc. A uniform resource locator (URL) may be included to identify location(s) for the descriptor information.

Although the recommendation server 18 will be discussed in this application primarily in regard to establishing and updating media item recommendation ratings based on communication with user devices 12, it is noted the recommendation server 18 may also provide other information and services to the user devices 12. These additional services may include, but are not limited to, receiving requests for and establishing new user accounts, managing and storing user account preferences, storing information about the user's media collections, and managing the flow of recommendations for media items to users. In a preferred embodiment, the recommendation server 18 operates in a client-server relationship with users rather than a direct peer-to-peer connection. However, the present invention may be implemented in a peer-to-peer configuration where features of the recommendation server 18 are distributed among one or more peer nodes, super peer nodes, or other devices. Further, note that the recommendation server 18 may be implemented as a number of servers operating in a collaborative fashion.

The user devices 12 also typically contain an audio/video (A/V) player 38 that allows the user to use or play back any media item desired. Examples of A/V players 38 include but are not limited to Apple® iTunes®, Apple® iPOD®, and the like. Media items selected for use and/or play include those stored locally at the user device 12 in a user's A/V collection 40, and/or any media item accessed from the recommendation server 18, the network database 28', another user device, the subscription service(s) 32, and/or any other system accessible by or coupled to the network 16. Media items can also be recommended to other users in response to a user causing its user device 12 to send a recommendation for a media item over the network 16. The recommendation may go to the recommendation server 18 and then to the destination user, or the recommendation may be sent directly to the destination user without reaching the recommendation server 18. However, the recommendation server 18 will be provided information at a minimum that indicates the recommendation for the media item was made to update the recommendation rating for the media item, as will be discussed herein.

In regard to the present invention, the user devices 12 contain recommendation engines 42. A recommendation engine 42 is a program, algorithm, or control mechanism that handles sending and/or receiving media item recommendations over the network 16, as will be described in this application. The recommendation engine 42 may also be responsible to communicate with the recommendation server 18 to obtain actual recommendation ratings for received media item recommendations. The receiving user device 12 may use the recommendation rating to sort recommendations as controlled by a user, or to calculate a recommendation score using a scoring engine for the recommended media item. An example of a recommendation scoring system that does not use the recommendation rating as provided by the present invention as an input, but may easily be adapted to do so by one of ordinary skill in the art, is described in co-pending U.S. patent application Ser. No. 11/484,130 entitled "P2P NETWORK FOR PROVIDING REAL TIME MEDIA RECOMMENDATIONS," which is incorporated herein by reference in its entirety.

In the system 10, the recommendation server 18 receives information when the user device 12, and in particular the recommendation engine 42, causes a media item recommendation to be sent to another user and/or when the user device 12 uses or plays a media item that has been recommended from another user. In response, the recommendation server 18 updates the recommendation rating for the media item in one or more recommendation tables 43 included in the database 28, so as to make available a dynamically updated media item recommendation rating to any of the user devices 12 and/or any device coupled to the network 16 that can access the recommendation server 18. The recommendation server 18 may also store media item recommendation ratings in one or more recommendation tables 43' in the network accessible database 28'.

Figure 2:
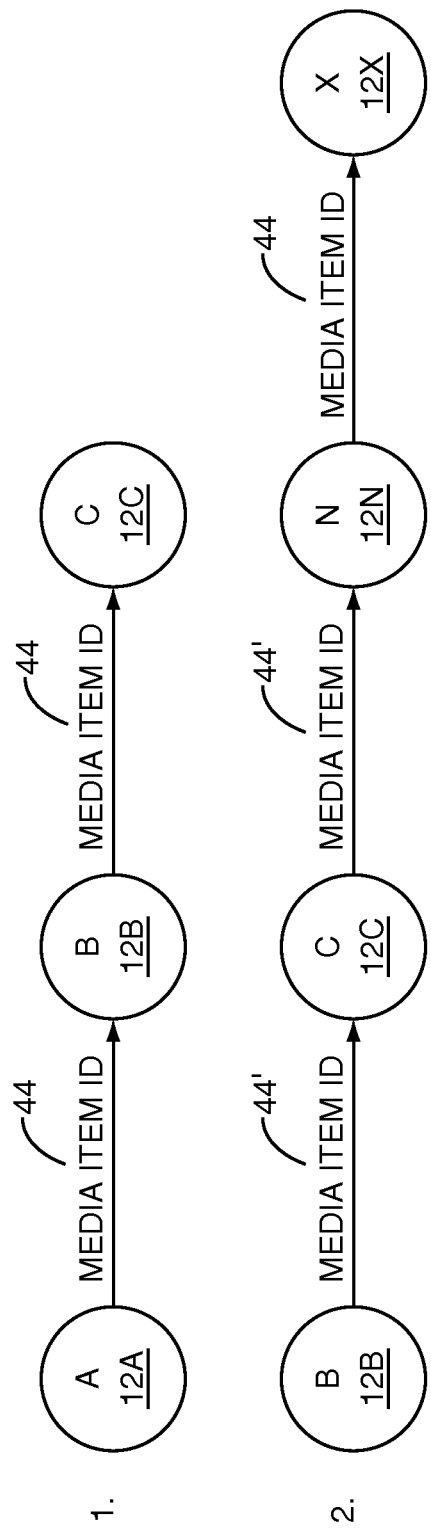
FIG. 2 illustrates exemplary users or node paths for recommended media items made by users.

FIG. 2 illustrates two examples of recommendation paths for media items between different users to illustrate how recommendations for media items may be originated and forwarded. As illustrated, a first or originating user 'A', also called 'node A', forwards a media item, via a media item id 44, to another user 'B' 12B. A node is an originating node for a particular media item if the node makes a recommendation for a media item to another user that was not received as a recommendation from another user. A unique media item id 44 uniquely identifies the media item since typically, it is not desired to upload the actual media item from a user device 12 to the network 16 when a recommendation is made. This avoids the actual time and bandwidth necessary to upload a media item to the network 16 for generating a recommendation as well as any permission rights issues associated with forwarding media items. If the recipient user is authorized to play and/or use the recommended media item, as identified by the media item id 44, the recipient user accesses the media item associated with the media item id 44 via their local A/V collection 40, or through the network 16, such as through the subscription service(s) 32, the recommendation server 18, and/or another server, including by purchase, as examples.

Turning back to example 1 in FIG. 2, after user 'B' 12B receives the recommendation for media item id 44, node 'B'

12B can in turn use or play the media item associated with the media item 44. Node 'B' 12B can also make a recommendation for the media item id 44 to another user, which is node 'C' 12C in the illustrated example.

In example 2 in FIG. 2, node 'B' 12B is the originating node for a media item recommendation, identified by media item id 44'. This means that node 'B' 12B is sending a recommendation for a media item that it did not previously receive as a recommendation from another user. A node can be an originating node for one particular media item, and then a recipient node for another media item recommendation. Determination of an originating versus a recipient node is made on a per media item basis. In example 2, the media item recommendation, again identified by media item id 44', is sent to node 'C' 12C, from node 'C' 12C to node 'N' 12N, and then to node 'X' 12X.

When a recommendation for a media item is made, the recommendation, via the media item id 44 in the preferred embodiment, is communicated to the recommendation server 18. The recommendation server 18 maintains the recommendation tables 43, 43' in databases 28, 28' for tracking originating nodes or users that made recommendations as well as establishing and maintaining an associated recommendation rating for media items. In this regard, examples of recommendation tables 43, 43' stored in memory are illustrated in FIGS. 3A and 3B. In FIG. 3A, a "recommendation table" 46 is illustrated. The recommendation server 18 uses the recommendation table 46 to determine if a received recommendation for a media item has already been previously recommended. If so, a table entry for the media item and associated recommendation rating has already been established. If not, the recommendation server 18 can create a new entry for the reported recommended media item in the recommendation table 46 so a recommendation rating is established and can be updated on subsequently reported recommendations and play actions resulting from recommendations for the particular media item.

For example, the recommendation table 46 in FIG. 3A illustrates that song "867-5309," represented by its media item id 44, was first recommended by user 'A' 12A as an originating user. The song "WHIP IT" is stored in the media item id 44 field of the recommendation table 46 as being first recommended by user 'B' 12B as the originating user for this media item. A recommendation id 47 is created within the recommendation table 46 when the recommendation is first made by an originating user. A recommendation rating 48 is established and maintained in the recommendation table 46 for the media item id 44. In the example of FIG. 3A, the recommendation rating 48 is a number rating, wherein a higher value represents a higher rating or higher recommendation value for the media item id 44. A number may be used for the recommendation rating 48 so that the recommendation server 18 can dynamically update the rating 48 by either increasing or decreasing the rating of a particular media item.

A relative recommendation rating level 50 may also be stored in the recommendation table 46 for a particular media item. For example, a rating level of '5' may be the highest rating, and a rating level of '1' may be the lowest. In this manner, the recommendation ratings 48 for each media item can be ranked relative to each other, rather than deciphering between a raw rating number, like used in the example of the recommendation rating 48 in FIG. 3A. Presenting a relative recommendation rating level 50 may be more easily interpreted by users, such as when recommendation ratings are presented on graphical user interfaces or displayed to users in some other manner, as will be described by example later in this application.

At a minimum, the purpose of the recommendation table 46 is to track media items that have been recommended by users so that a recommendation rating for the media item can be established and dynamically updated. If a media item is not recommended, a recommendation rating is not established in the recommendation table 46. The recommendation table 46 in the example of FIG. 3A has at a minimum, the originating user for each media item recommended, as well as a recommendation rating 48.

FIG. 3B illustrates a "received recommendations table" 52 that may also be stored in the recommendation tables 43, 43' and dynamically updated by the recommendation server 18 for use in maintaining and updating recommendation ratings 48 for media items. The received recommendations table 52 is one form of a recommendation path table. The purpose of a recommendation path table, and the received recommendations table 52 as one form of a recommendation path table, is to track the recommendation paths for media items, such as recommendation paths illustrated in the recommendation path examples of FIG. 2 discussed above. This allows the recommendation server 18 to determine if a particular media item was received by a user as a result of a recommendation from another user. If so, and the recipient uses or plays the media item, the recommendation server 18 updates the recommendation rating 48 for the media item. This is because the media item used or played by the recipient user was received as a recommendation from another user. This is how the recommendation server 18 distinguishes play actions not relating to recommendations, where the recommendation rating 48 should not be updated.

For example, the received recommendations table 52 in FIG. 3B illustrates that recommendation id (47) #24 (song "867-5309") was received as a recommendation from user 'B' 12B in the "receiver id" field 54 by user 'A' 12A in the "recommender id" field 56. Recommendation id #24 (song "867-5309") was then recommended by user 'B' 12B to user 'C' 12C, as shown in the received recommendations table 52. This is the recommendation flow path illustrated previously in example 1 of FIG. 2. The recommendation flow path of example 2 of FIG. 2 is also shown in the received recommendations table, where recommendation id #108 was sent as a recommendation by user 'B' 12B to user 'C' 12C, user 'C' 12C to user 'N' 12N, and user 'N' 12N to user 'X' 12X.

Figure 4:
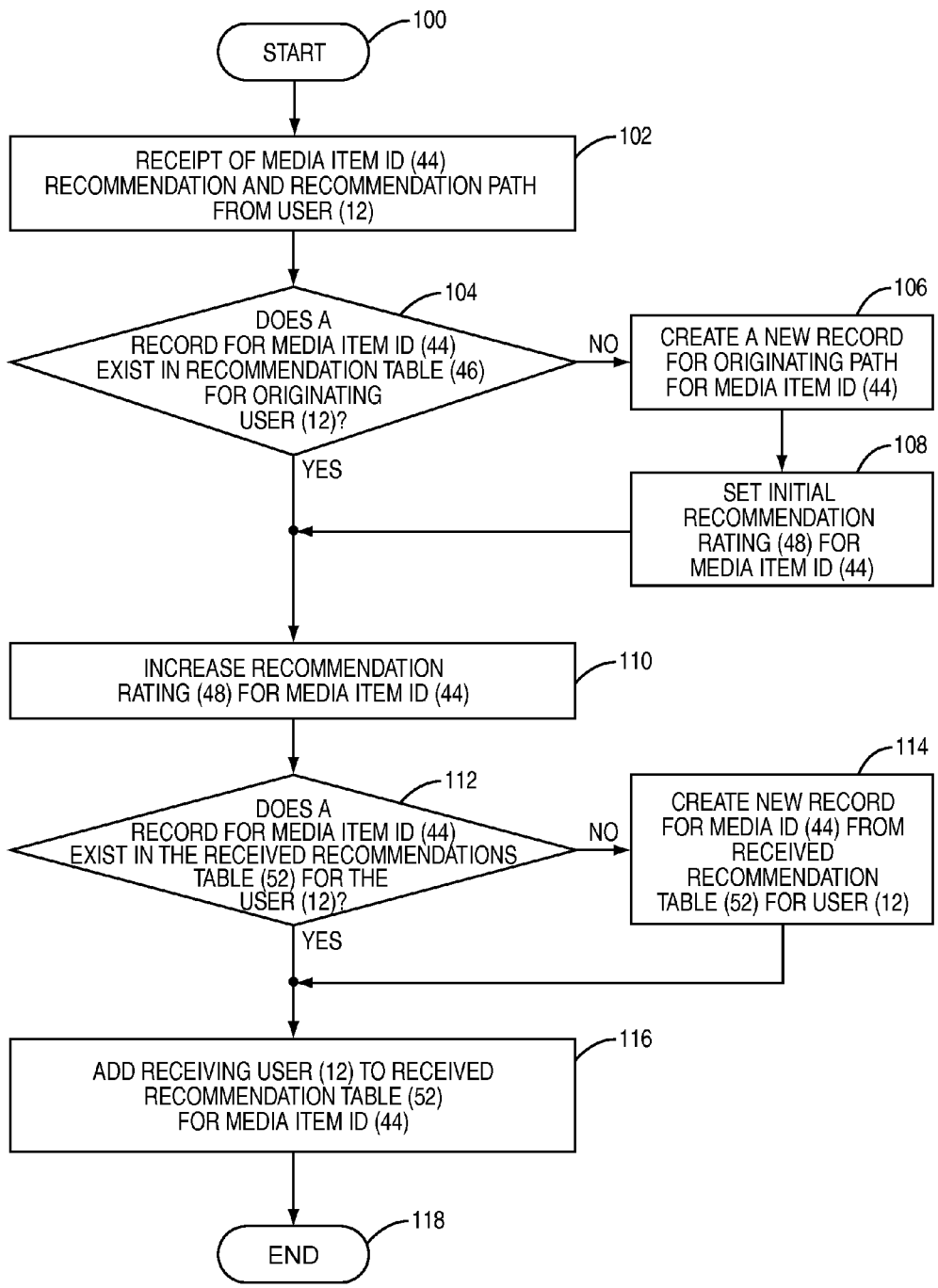
FIG. 4 is a flow chart illustrating an exemplary embodiment of setting up an initial recommendation rating for a media item and updating a "received recommendations table" in response to a user sending a recommendation for a media item.

FIG. 4 is a flow chart that illustrates an embodiment of how the recommendation server 18 receives a reported recommendation from a user device 12 and how the recommendation tables 43, 43' and recommendation rating 48 for the recommended media item is established and updated. The process starts (100) when the recommendation server 18 receives a report of a media item recommendation, in the form of a media item id 44, and recommendation path or recipient from a user device 12 (step 102). The recommendation server 18 determines if a record for the particular media item id 44 received exists in the recommendation table 46 for an originating user 12 (decision 104). If not, this means that the particular media item has not been previously recommended, and the user 12 that reported the media item to the recommendation server 18 is an originating user or node. As a result, the recommendation server 18 creates a new record for the originating path for the media item id 44 in the recommendations table 52, as shown in FIG. 3A (step 106). Since the recommended media item is newly recommended and a recommendation rating 48 was not previously established for the media item, an initial recommendation rating 48 is created for the media item id 44 in the recommendations table 46 as well (step 108).

Next, the recommendation rating 48 for the media item id 44 is increased in the recommendation table 46. This is because the recommendation rules in one embodiment call for increasing the recommendation rating 48 every time a recommendation is sent by a user (step 110). In an alternative embodiment not illustrated, the recommendation server 18 may only increase the recommendation rating 48 for a media item if the recommendation is destined for a new recipient user who has not previously received the recommendation for the media item. The recommendation server 18 could determine this by checking the received recommendations table 52 to determine if the same recommendation path has been previously performed for a given media item.

The recommendation server 18 then determines if a record for the media item id 44 exists in the received recommendations table 52 for the originating user 12 (decision 112). This decision is made to determine if the path between the originating user 12 and the recipient user for the media item recommendation was previously made. If not, a new record is created in the received recommendations table 52 for media item id 44, since the recommendation is new for the media item id 44 (step 114). Thus, a record must be created in the received recommendations table 52. If a record for the media item id 44 recommended already exists in the recommendation table 52, a new record is not created since one already exists. Thereafter, the receiving or recipient user that is to receive the media item id 44 recommendation is added to the received recommendations table 52 to record the recommendation path (step 116), and the process ends (step 118). The recommendation server 18 needs to know if a particular recommendation path has been previously performed, because only unique recommendation paths trigger an increase in the recommendations rating 48 for play actions in the preferred embodiment, as discussed below for the flow chart in FIG. 5.

Thus in summary, the flow chart of FIG. 4 illustrates that when a user makes a media item recommendation, the recommendation, via the media item id 44, is reported to the recommendation server 18. Because of the recommendation being made, the recommendation rating 48 for the media item is increased. The recommendation rating 48 may be increased for a given media item id 44 each time it is recommended regardless of the recommendation path, or only for unique recommendation paths. If a record has not been previously established in the recommendation table 46 for the media item id 44 and for the recommendation path for the media item id 44 in the received recommendations table 52, new records are established accordingly. In this manner, the recommendation server 18 can look up information in the recommendation table 46 and the received recommendations table 52. This information is used to dynamically update the recommendation rating 48 for media items based on play actions that result from recommendations as opposed to play actions not related to recommendations. The recommendation server 18 may, in addition to forwarding the media item id 44, also automatically forward the newly established or updated recommendation rating 48 for the media item id 44 to the recipient. Alternatively or in addition, clients or user devices 12 can also, upon their own initiative, send a request over the network 16 to the recommendation server 18 to specifically obtain the recommendation rating 48 for media items. The recommendation rating 48 may be used for any number of reasons, including but not limited to allowing a user to sort through received recommendations by recommendation rating 48, or to calculate a media item recommendation score with the recommendation rating 48 provided as an input to such calculation, for received recommendations as examples.

Figure 5:
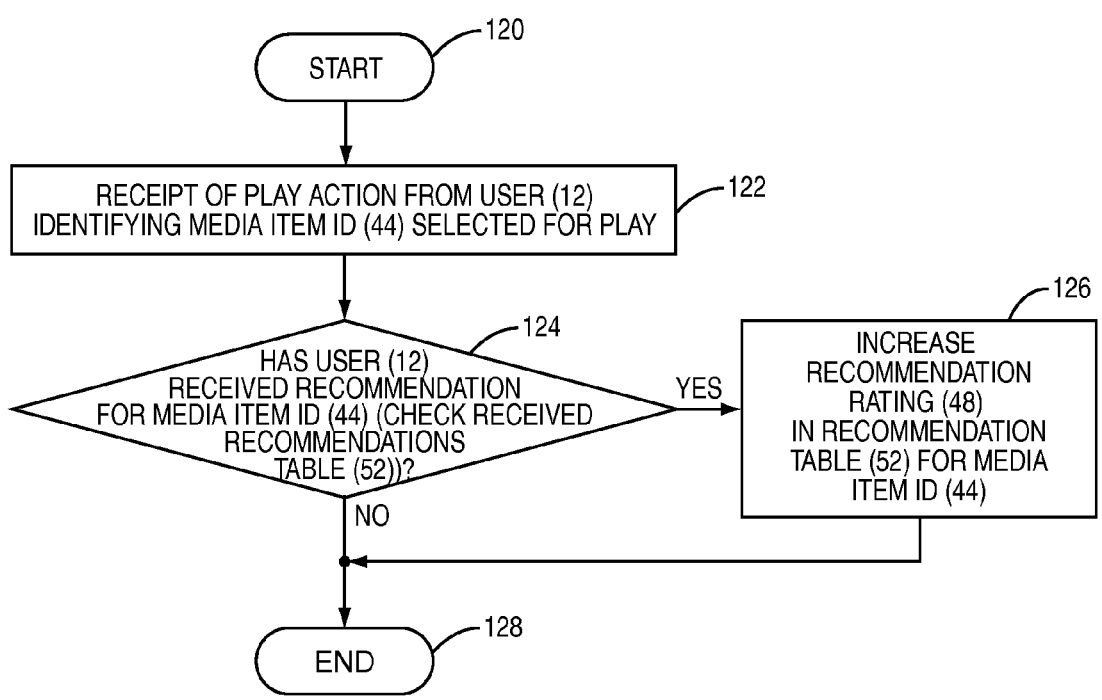
FIG. 5 is a flow chart illustrating updating a recommendation rating for a media item in response to usage or play of the media item received as a recommendation from another user in accordance with one embodiment of the present invention.

FIG. 5 illustrates a flow chart showing the operation of the recommendation server 18 when a play action message is received from a user or user device 12. Because play actions can affect the recommendation rating if the play action is in relation to a recommendation, the recommendation server 18 evaluates play actions for media items. The process starts (step 120), and the recommendation server 18 receives a message for a play or usage action of a media item from a user device 12, with the media item identified by its media item id 44 (step 122). The recommendation server 18 determines if the user has received the media item being used or played as a recommendation by checking the received recommendations table 52 (decision 124). Because the received recommendations table 52 is updated with users that received recommendations in response to a recommendation made by another user, the recommendation server 18 can use information in this table 52 to trace back whether the media item at issue was recommended to the user. If not, the message received by the recommendation server 18 is simply a play action not related to a recommendation, in which case the process ends (step 128). If the recommendation server 18 determines the media item being used or played was recommended previously to the user, the recommendation rating 48 is increased in the recommendation table 46 for the media item (step 126). This is because the play action resulted from a recommendation.

It should be recognized that although the recommendation rating 48 of media items is discussed above as being increased in response to recommendations for media items (e.g. FIG. 4) and play actions for recommended media items (e.g. FIG. 5), the increase may not be the same for each action. It may be desired to weight an increase in the recommendation rating 48 for a media item recommendation more heavily than an increase in the recommendation rating 48 for play action. The same is true vice versa. Further, the increase for a recommendation rating 48 could be performed in a non-linear fashion, such as by use of a degrading scale, where the recommendation ratings 48 increase amount becomes less as the number of recommendations and/or play actions for recommended media items increases. The degrading recommendation rating 48 increase may be performed for play actions for media items recommended, or media item recommendations to other users, or both. The recommendation rating 48 increase could actually convert to a decrease if a recommendation for a media item is never played by a recipient user, or is not played within a certain period of time. The recommendation tables 43, 43' could include timestamps to track the elapsed time between a recommendation for a media item and its play by a recipient user. A timeout may be used wherein the recommendation server 18 is automatically notified without a play action that a recommendation for a media item has not been played within a designated period of time, or the recommendation server 18 could analyze elapsed time between plays for recommended media items only after receiving a recommendation or play action for a particular media item. It should be noted that the present invention is not limited to any particular type of increase or decrease system, methodology, or algorithm.

Figure 6:
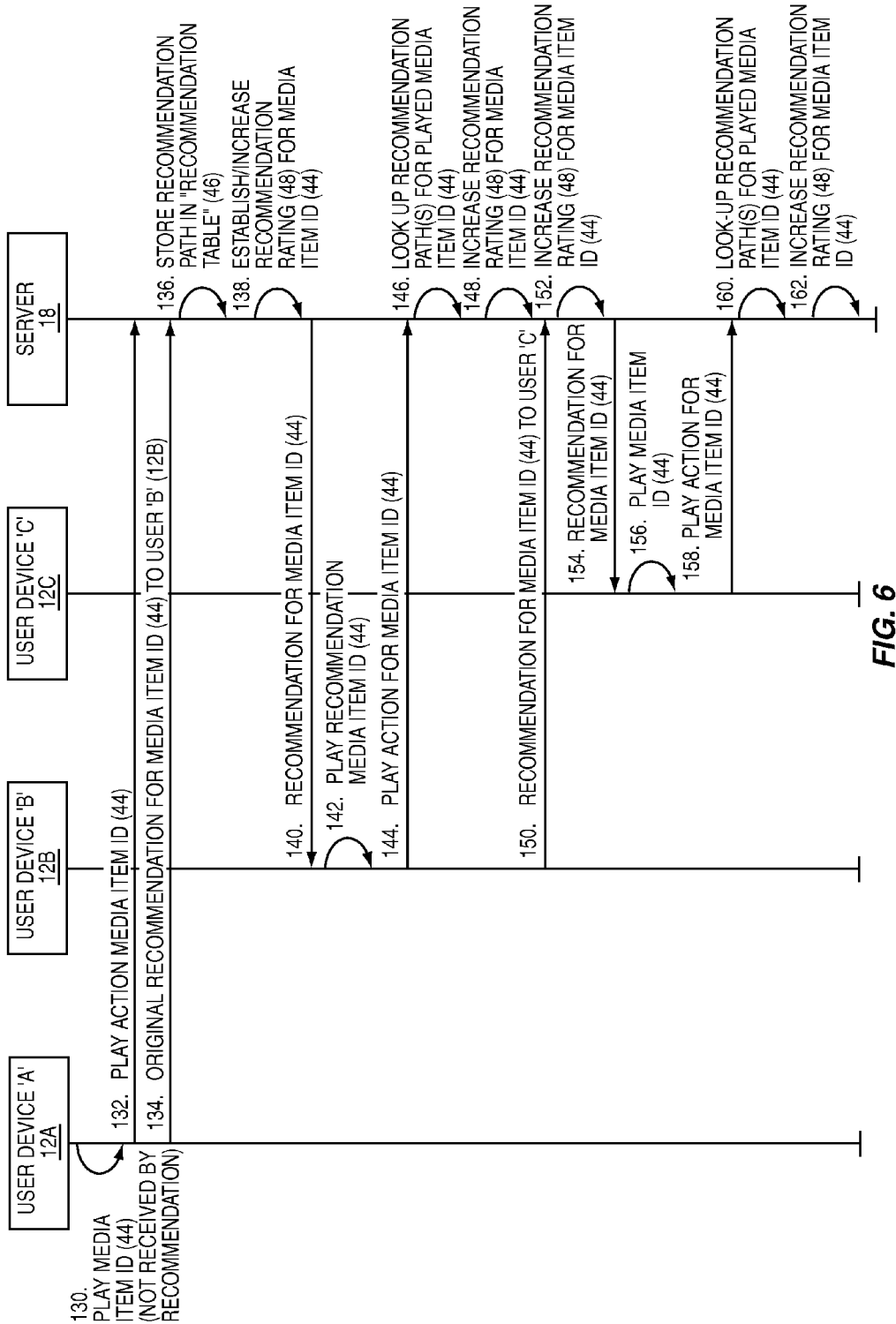
FIG. 6 illustrates an exemplary communication flow diagram between user devices and the recommendation server for sending and receiving media item recommendations between users, reporting media item recommendations and associated usage or play, and updating recommendation ratings for media items in response to reported recommendations and associated usage or play.

FIG. 6 illustrates a communication flow diagram of how media item recommendations may be tracked and recommendation ratings established and dynamically updated in accordance with one embodiment of the present invention. FIG. 6 shows the interaction between the user devices 12 and the recommendation server 18. The actions taken internally by the recommendation server 18, including establishing and updating the recommendation rating 48, are shown generally in the flow diagram and relate back to the flow chart operations described above with respect to FIGS. 4 and 5.

The exemplary flow diagram in FIG. 6 shows media item recommendations being communicated between the exemplary three nodes or user devices 12 illustrated in the recommendation path example 1 of FIG. 2; namely user device 'A' 12A, user device 'B' 12B, user device 'C' 12C. FIG. 6 illustrates the flow communication path between these nodes and the recommendation server 18 to dynamically maintain a recommendation rating 48 for media items.

Turning to FIG. 6, the user device 'A' 12A may choose to use its A/V player 38A to play a particular media item, according to the media item id 44, which was not received as a recommendation from another user (step 130). In this instance, since the media item was not played or received as a result of a recommendation, the recommendation rating for this media item will not be affected. However, the play action by user device 'A' 12A initiates a play action message identifying the media item id 44 played to the recommendation server 18 (step 132). This is so the recommendation server 18 can determine if the recommendation rating for the media item id 44 should be updated based on user device 'A's 12A play. Because the play action was not from a recommendation to user 'A' 12A, the recommendation server 18 does not update the recommendation rating for the associated media item id 44. In this manner, as previously described above, simply play actions not relating to a recommendation do not affect a recommendation rating of a media item.

If user device 'A' 12A determines that the media item should be recommended to another user, such as user device 'B' 12B for example as illustrated in FIG. 2, the user device 'A' 12A communicates the media item id 44 associated with the recommendation to the recommendation server 18 (step 134). The recommendation server 18 establishes and/or stores the recommendation path from user device 'A' 12A to user device 'B' 12B for the media item id 44 in the received recommendations table 52, as previously provided in FIG. 4 (step 136). The recommendation server 18 then updates the recommendation rating 48 for the media item in the recommendation table 46 based on the media item being recommended (step 138). If the recommendation server 18 is also responsible for forwarding the recommendation for the media item to the destination node, which is user device 'B' 12B in this example, the recommendation server 18 will communicate the media item id 44 to the recipient user (step 140).

In addition to the media item id 44, the recommendation server 18 may also automatically communicate the recommendation rating 48 to the recipient user as previously noted. The recipient user and/or its client application 14 may use the recommendation rating 48 directly to sort recommendations, or the recommendation rating 48 may be used as an input to calculate a recommendation score, which may be used for a variety of applications and purposes. Automatic communication of the recommendation rating 48 when forwarding a recommended media item id 44 also avoids the recipient user from having to send a separate request to the recommendation server 18 for the recommendation rating 48, although the recipient user may do so with such being contemplated by the present invention. Also, note that the recommendation server 18 may only be responsible for creating and maintaining the recommendation rating 48 without also being responsible for forwarding a recommendation to a recipient.

The recipient, which is user device 'B' 12B in the example, may then decide to use or play the received recommended media item (step 142). In this instance, this action is indicative of the popularity of the media item since the recipient user was willing to use or play it based on a recommendation. In response, the user device 'B' 12B sends a play action message for the media item id 44 to the recommendation server 18 to report the usage or play (step 144), which is illustrated as being received by the recommendation server 18 in the flow-chart of FIG. 5 as an example. The recommendation server 18 looks up the recommendation path for the media item in the received recommendations table 52 to determine if the media item was previously recommended (step 146). If so, the recommendation rating 48 for the media item is increased, as illustrated in the flow chart of FIG. 5 as an example (step 148). If the media item reported as being used or played by user device 'B' 12B to the recommendation server 18 was not previously recommended to user 'B' 12B, the recommendation rating 48 would not be increased.

From there, user device 'B' 12B may forward a recommendation for the same media item to yet another user, which is user device 'C' 12B in the illustrated example (step 150). Again, the recommendation rating 48 for the media item will be increased by the recommendation server 18 (step 152), because of the additional recommendation of the media item to another user. Again, if the recommendation server 18 is responsible for also forwarding the recommendation for the media item to the user device 'C' 12C, the recommendation server 18 will perform that action (step 154). The user device 'C' 12C may decide to use or play the media item received from the recommendation, just as was the case for user device 'B' 12B (step 156). Again, the play action results in a message being communicated to the recommendation server 18 (step 158), to determine if usage or play of the media item was related to a received recommendation (step 160) and to increase the recommendation rating 48 if so (step 162).

In an alternative embodiment, the recommendation tables 43, 43' may also include a "sent recommendations table" 170 as illustrated in FIG. 7. The purpose of the sent recommendations table 170 is similar to that of the received recommendations table 52 in that the table 170 is used to determine the recommendation paths for a media item. The sent recommendations table 170 is used to determine if a play or use action by a user is related to a previous recommendation received for the media item. If so, the recommendation rating 48 is increased. The table 170 contains the same information as the received recommendations table 52, including a recommendation id 172 for the recommended media item, but with the remaining fields in reverse order. Namely, the recommender id 174 is provided first, and the receiver id 176 provided second. In this manner, the recommendation server 18 may more efficiently search for recommendation paths when performing recommendation rating related tasks by searching based on the recommender id 174 rather than the receiver id 176, including those described previously.

Figure 8:
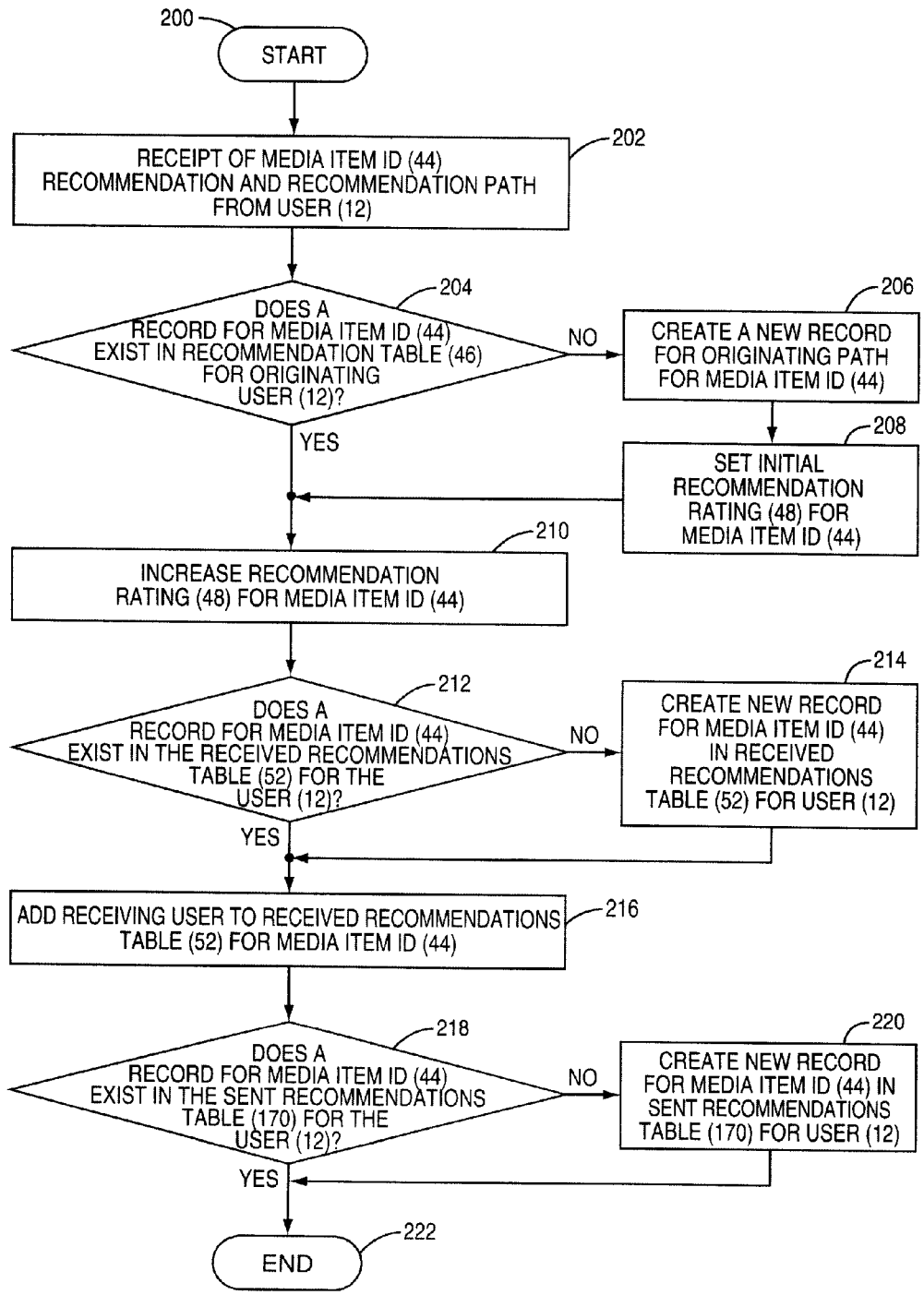
FIG. 8 is a flow chart illustrating an exemplary alternative embodiment to the flowchart of FIG. 4 of setting up an initial recommendation rating for a media item and updating the "received recommendations table" and the "sent recommendations table" in response to a user sent recommendation for a media item.

FIG. 8 is a flow chart that illustrates another embodiment of how the recommendation server 18 receives a reported recommendation from a user device 12B and how the recommendation tables 43, 43' and recommendation rating 48 for the recommended media item are established and updated. The flow chart describes a similar, but alternative embodiment to the flow chart of FIG. 4. In FIG. 8, the sent recommendations table 170 illustrated in FIG. 7 is additionally updated and searched to determine if the recommendation rating 48 of a media item is increased. Steps 200-216 of FIG. 8 are essentially the same steps as steps 100-116 in FIG. 4, and thus the description of steps 100-116 for FIG. 4 above are applicable and not repeated here. However, the recommendation server 18, as illustrated in FIG. 8, additionally maintains a sent recommendations table 170 as well.

As illustrated in FIG. 8, after a media item recommendation is added to the received recommendations table 52 in step 216, the recommendation server 18 determines if a record for the media item also exits in the sent recommendations table 170 (decision 218). If not, a new record is created so that the sent recommendations table 170 has a record of sent recommendations primarily by recommender as opposed to primarily by receiver, as provided in the received recommendations table 52 (step 220). The process then ends 222. Again, the recommendation server 18, by maintaining both a received recommendations table 52 and a sent recommendations table 170, may provide for more efficient searching when play or use action messages are received to determine if the play or usage of a media item is from a previous recommendation for updating the recommendation rating 48 of a particular media item.

Figure 9:
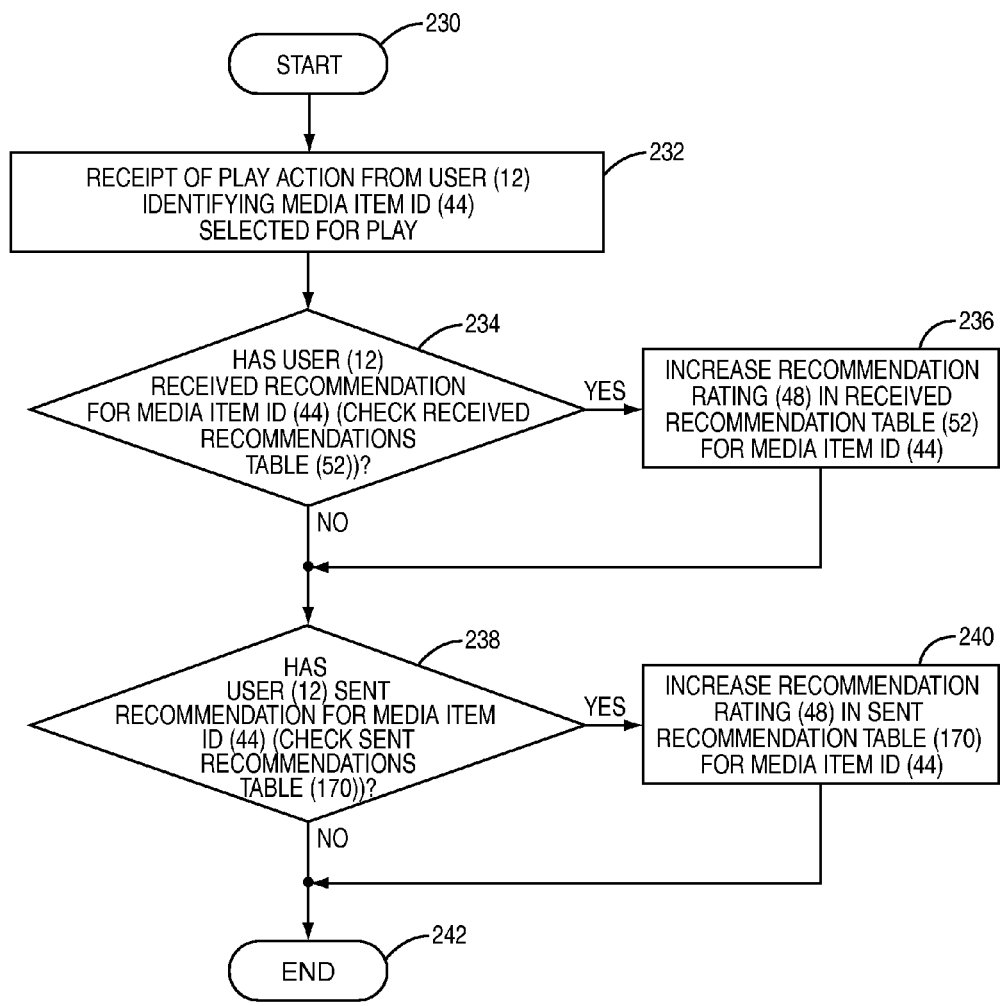
FIG. 9 is a flow chart illustrating an exemplary alternative embodiment to the flowchart of FIG. 5 updating a recommendation rating for a media item in response to usage or play of the media item received as a recommendation from another user and sent to another user as a recommendation in accordance with one embodiment of the present invention.

FIG. 9 is a flow chart that illustrates another embodiment of how the recommendation server 18 updates a recommendation rating 48 in response to a use or play action of a media item that was previously recommended. The received recommendations table 52 and the sent recommendations table 170 are both checked. The flow chart describes a similar, but alternative embodiment to the flow chart of FIG. 5 that only checks the received recommendations table 52 to determine if the recommendation rating 48 of a media item is increased. Steps 230-236 of FIG. 9 are essentially the same as steps 120-126 of FIG. 5, and thus the description for steps 120-126 is applicable for steps 230-236 in FIG. 9.

As illustrated in FIG. 9, after the recommendation server 18 has checked the received recommendations table 52 to determine if the play or use action for the media item was previously recommended (decision 234), the recommendation server 18 determines the same thing by checking the sent recommendations table 170 as well or in the alternative (decision 238). If so, the recommendation rating 48 for the media item is increased (step 240), and the process ends (step 240). In this regard, if it is more efficient to check the sent recommendations table 170 as opposed or in addition to the received recommendations table 52, the recommendation server 18 can do so to determine if the recommendation rating 48 for a media item should be increased.

FIG. 10 illustrates an example of a populated media collection that may be presented by the client application 14 on the user device 12 to a user. FIG. 10 illustrates one example application of how the recommendation rating system 10 of the present invention may be used in an application to assist the user in viewing and/or choosing media items. The illustrated example is for songs, but such is also applicable for any type of media items including but not limited to videos or presentations. As illustrated, a main media collection page or window 300 is provided. The current content being played by the user is shown in a currently playing box 302. User controls 304 are provided to allow the user to control the A/V player 38 on the user device 12, such as reversing, forwarding, and playing selected items. A volume slide control 306 is also provided to allow the user to control the volume of the A/V player 38.

Media items that are either populated from a server, which may or may not be the recommendation server 18, or from the user's A/V collection 40, or both and sent to the client application 14 are listed in a music item table 308. The music item table 308 consists of numerous columns that provide key information about the music items to the user. A title column 312 provides the title of the music item. A time column 314 provides the length or duration of the music item when played. An artist column 316 provides the artist of the music item. An album column 318 provides the name of the album the song was included on. A score column 320 provides a score in terms of importance to the user according to their user preferences stored as a result of the registration process and/or determined by a server based on the owned media items in the user's A/V collection 40. A genre column 322, a year column 324, a received column 326, and a played column 328 provides the genre type, the year of release, the date and time of receipt, and the date and time of the last play of the music item. A scroll bar 330 is available for the user to scroll up and down through their song items.

A recommender column 311 contains a user id or name of the person or friend that recommended the content to the user. The user can establish a list of friends that are able to provide recommendations as disclosed in U.S. patent application Ser. No. 11/484,130 entitled "P2P NETWORK FOR PROVIDING REAL TIME MEDIA RECOMMENDATIONS" previously referenced above. The user is able to navigate the media item table 308 by "point and click" to play items, download items, and request content from a server and/or other sources.

The recommendation rating column 310 is provided to show the user the recommendation rating 48 of the music items in their music item table 308. Alternatively and not shown, a recommendation score may be generated by the client application 14 based on the recommendation rating 48 and displayed in the recommendation rating column 310, and/or used by the client application 14 and/or the media collection window 300. In the example of FIG. 10, the user has selected the music items to be displayed according to their recommendation rating 48, with the highest rating appearing first and the lowest rating appearing last, except for music items not having a recommendation rating 48. This is indicated by a blank field being located beside these media items, which are shown at 332 for the bottom two media items listed in the music item table 308. In this manner, the user can make media item selections, namely music items, based on the recommendation rating 48 of the item. The user device 12 would communicate with the recommendation server 18 over the network 16 to obtain the recommendation ratings 48 for each of the media items accessible by and/or selected by the user. This is one example of the possible applications of the present invention.

An iteration of the media collection page 300 is illustrated in FIG. 11, where the relative recommendation rating level 50 is displayed to the user rather than a raw recommendation rating 48. This may prevent constant reordering or churn of the order of the media items displayed in the music item table 300 in the event that the client application 14 updates the recommendation rating for the music items displayed on a continuous or periodic basis. The relative recommendation rating level 50, as provided in the recommendation table 46 illustrated in FIG. 3A and previously described above, may be easier for a user to view and peruse. In addition, since the present invention dynamically updates the recommendation rating 48, the rating numbers 48, as illustrated in FIG. 10, may become too large in digit size to be easily displayed and/or displayed in the allotted real estate in the recommendation rating column 310. Further, recommendation ratings 48 may continuously be in flux or changing; however, the relative recommendation rating level 50 may not be altered as often since a relative recommendation rating level 50 is less susceptible to change in a given period of time. Thus, a relative recommendation rating level 50 may cause less constant reordering of the music items displayed in the media collection page 300.

In the example of FIG. 11, a star rating system is used to display the recommendation rating in the recommendation rating column 310. In this example, a five-star recommendation rating is the highest, and a one-star rating is the lowest. The recommendation server 18 and/or the client application 14 may convert either the recommendation rating 48 or the relative recommendation rating level 50 into a visually pleasing ranking. For example, if the relative recommendation rating level 50 is a number from one to five, this number can be converted into a scalable visual item same in number, such as but not including a star, circle, diamond, or any other visual indicator desired. A number may also be used for displaying the relative recommendation rating level 50.

FIG. 12 illustrates a flow chart wherein the recommendation server 18 determines a relative recommendation rating level 50 for media items stored in the recommendation table 42. This process may be used by client applications 14 to display and rank media items by recommendation rating 48 as opposed to raw scores or numbers. Also note that this process may also be implemented on the client application 14 as opposed to the recommendation server 18. The process starts (step 340), and a determination is made as to the number of unique media item ids 44 stored in the recommendation table 46 (step 342). The number of entries is divided by the number of levels desired for the relative recommendation rating level 50 to determine the cut off levels for assigning each media item id 44 to its relative level as compared to the other media item ids 44.

For example, if there are 10,000 unique media item ids 44 in the recommendation table 46, and there are five relative recommendation levels desired, the cutoffs for each level would be 2,000. The 2,000 media items having a recommendation rating 48 in the lowest of all media item ids 44 would be assigned the lowest relative rating, for instance '1'. The 2,000 media items having a recommendation rating 48 in the highest of all media item ids 44 would be assigned the highest relative rating, for instance '5'. After the cutoff or levels are determined, the relative recommendation rating levels 50 for the media items ids 44 in the recommendation table 46 are assigned or overwritten with the correct relative rating. Thus, the relative recommendation rating level 50 for a media item can change dynamically and over time depending on the success of other media items having their recommendation ratings 48 increase. What may typically happen is that a new media item release will start with a low recommendation rating 48, move higher and possibly to the highest level over time if recommended heavily, and then over time move back down in levels after a period of time when other media items overtake it, especially if the recommendation rating 48 is decreased or penalized in rating as the media item becomes less recommended over time. Also note that any of the aforementioned features provided for the recommendation rating 48 may also be used to provide an input into a scoring engine for calculating a recommendation score for media items.

FIG. 13 illustrates an alternative media item recommendation system 10 for establishing and maintaining a media item recommendation rating that does not use a recommendation server 18. The present invention is not limited to a recommendation server 18 establishing and maintaining recommendation ratings for media items. In FIG. 13, a peer system 10' is illustrated. In this system 10', a plurality of user devices 12' act a peer devices communicating with each other in a peer-to-peer manner to forward media item recommendations, similar or the same as the system described in previously referenced co-pending U.S. patent application Ser. No. 11/484,130 entitled "P2P NETWORK FOR PROVIDING REAL TIME MEDIA RECOMMENDATIONS.". The peer user devices 12' are coupled to the network 16 to communicate with each other. In general, the peer device 12' includes a control system having associated memory. The peer device 12' also includes a storage unit. The storage unit may be any number of digital storage devices such as, for example, one or more hard-disc drives, one or more memory cards, RAM, one or more external digital storage devices, or the like. The peer device 12' also includes a communication interface. The peer device 12' may also include a user interface, which may include components such as a display, speakers, a user input device, and the like.

One user device 12' (user device 'B' in the illustrated example) may be deemed a "super" peer device 12B', meaning that it has increased responsibilities for establishing and maintaining the recommendation tables 46 and the recommendation ratings 48 for the media items recommended and played as a result of recommendations between peer user devices 12'. The super peer device 12B' may not contain an A/V player 38B' since it may be a more dedicated machine not intended to be used for using or playing media items.

The super peer device 12B' may include a recommendation engine 42B' that can perform some or all of the same aforementioned functionalities of recommendation server 18. The super peer device 12B' may include a database 28" for storing the recommendation tables 43", or a network recommendation database 28'" separate from the super peer device 12B' may be provided on the network 16 to provide storage for the recommendation tables 43'". The super peer device 12B' may send and receive recommendations, and/or their associated recommendation ratings 48 automatically, to and from other peer user devices 12' in addition to receiving reports regarding media item recommendations. Or, the other user devices 12' may send the actual media item recommendations directly to other users 12' in a peer-to-peer communication with a separate reporting message only being communicated to the super peer device 12B' to establish and update the recommendation ratings 48 for media items. The peer user devices 12' may access the recommendations tables 43", 43'" via communications to the recommendation server 18 or the super peer device 12B' to access the recommendation ratings 48 for media items for any variety of applications, including those illustrated as examples in the media collection page 300 illustrated in FIGS. 11 and 12.

Those skilled in the art will recognize improvements and modifications to the preferred embodiments of the present invention. All such improvements and modifications are considered within the scope of the concepts disclosed herein and the claims that follow.

What is claimed is:

1. A method of rating media item recommendations that are sent from a sending user to a recipient user, at a server, comprising the steps of:
   receiving a report of a media item recommendation of a media item, wherein the report comprises information about a recommendation path for the media item recommendation;
   storing the recommendation path for the media item recommendation;
   altering a recommendation rating associated with the media item in response to receiving the report of the media item recommendation using an alteration scale;
   receiving a report of a play or usage action for the media item; and
   altering the recommendation rating in response to receiving the report of the play or usage action using a different alteration scale than the alteration scale used for altering the recommendation rating in response to receiving the report of the media item recommendation.

2. A non-transitory computer-readable medium storing software for instructing a controller of a recommendation server in a media recommendation rating system to:

receive a report of a media item recommendation of a media item, wherein the report comprises information about a recommendation path for the media item recommendation;
store the recommendation path for the media item recommendation;
alter a recommendation rating associated with the media item in response to receiving the report of the media item recommendation using an alteration scale;
receive a report of a play or usage action for the media item; and
alter the recommendation rating in response to receiving the report of the play or usage action using a different alteration scale than the alteration scale used for the altering recommendation rating in response to receiving the media item recommendation.

3. The computer-readable medium of claim 2, wherein to alter the recommendation rating in response to receiving the report of the play or usage action using a different alteration scale than the alteration scale used for the altering recommendation rating in response to receiving the media item recommendation, the software further instructs the controller of the recommendation server to alter the recommendation rating associated with the media item in response to a play or usage of the media item by a play user only if the media item was previously recommended to the play user.

4. The computer-readable medium of claim 2, wherein the software further instructs the controller of the recommendation server to determine if the recommendation path, comprised of a sending user and a recipient user, has been previously established in a recommendation path table associated with the media item being recommended.

5. The computer-readable medium of claim 4, wherein the software further instructs the controller of the recommendation server to receive a play or usage action for a media item from a play user.

6. The computer-readable medium of claim 5, wherein the software further instructs the controller of the recommendation server to determine if the media item associated with the play or usage action was previously recommended to the play user by determining if the play user is the recipient user in the recommendation path table for the media item associated with the play or usage action.

7. The computer-readable medium of claim 6, wherein the software further instructs the controller of the recommendation server to alter a recommendation rating for the media item associated with the play or usage action if the media item associated with the play or usage action was previously recommended to the play user.

8. A non-transitory computer-readable medium storing software for instructing a controller of a user device to:
obtain a recommendation rating for each of one or more media items; and
provide a user interface including a media item table, the media item table comprising media columns, comprising:
a media item identification column comprised of a plurality of different media identifiers for a plurality of associated media items including the one or more media items; and
a recommendation rating column located proximate to the media item identification column comprised of the recommendation ratings for the one or more media items, which are associated with and located proximately to one or more of the plurality of different media identifiers,
for each media item of the one or more media items:
altering the recommendation rating of the media item in response to receiving a recommendation for the media item by a sending user using an alteration scale; and
after receiving the recommendation from the sending user for the media item, altering the recommendation rating of the media item in response to the media item being used or played by a play user using a different alteration scale than the alteration scale used for altering the recommendation rating in response to receiving the report of the media item recommendation.

9. The computer-readable medium of claim 8 wherein the media identifiers comprise media titles.

10. A server in a media item recommendation system, comprising:
a communication interface;
at least one processor operatively in communication with the communication interface; and
memory containing software executable by the at least one processor whereby the server is operative to:
receive a report of a media item recommendation of a media item, wherein the report comprises information about a recommendation path for the media item recommendation;
store the recommendation path for the media item recommendation;
alter a recommendation rating associated with the media item in response to receiving the report of the media item recommendation using an alteration scale;
receive a report of a play or usage action for the media item; and
alter the recommendation rating in response to receiving the report of the play or usage action using a different alteration scale than the alteration scale used for altering the recommendation rating in response to receiving the report of the media item recommendation.

11. The server of claim 10, wherein the information about a recommendation path for the media item comprises information identifying the media item, a first user account that originated the media item recommendation, and a second user account that received the media item recommendation.

12. The server of claim 11, wherein to receive the report of a play or usage action for the media item, the server is operative to receive the report of the play or usage action for the media item from a second device associated with the second user account.

13. The server of claim 11, wherein the server is further operative to determine if a recommendation path, comprised of the first user account and the second user account, has been previously established in a recommendation path table associated with the media item being recommended.

14. The server of claim 13, wherein the server is further operative to establish the recommendation path in the recommendation path table if the recommendation path was not previously established.

15. The server of claim 13, wherein the server is further operative to store the recommendation path in the recommendation path table.

16. The server of claim 13, wherein the recommendation path table comprises a recommendation id, a recipient id identifying the second user account, and a recommender id identifying the first user account.

17. The server of claim 13, wherein the recommendation path table is comprised of two tables consisting of a received recommendations table and a sent recommendations table.

18. The server of claim 10, wherein to alter the recommendation rating in response to receiving the report of the play or usage action using a different alteration scale than the alteration scale used for altering the recommendation rating in response to receiving the report of the media item recommendation, the server is further operative to alter the recommendation rating associated with the media item in response to receiving a report of a play or usage of the media item only if the media item was previously recommended to the play user.

19. The server of claim 10, wherein the server is further operative to determine if the media item has an established recommendation rating in memory prior to altering the recommendation.

20. The server of claim 19, wherein the server is further operative to establish the recommendation rating associated with the media item being recommended if the recommendation rating has not been previously established.

21. The server of claim 20, wherein the server is further operative to establish an initial recommendation rating for the media item being recommended after establishing the recommendation rating for the media item.

22. The server of claim 10, wherein the media item being recommended is comprised from the group consisting of the media item, and a media item identifier identifying the media item.

23. The server of claim 10, wherein the server is further operative to send the media item being recommended to the recipient user on behalf of the sending user.

24. The server of claim 10, wherein the server is operative to store the recommendation rating for the media item being recommended in a recommendations table that contains a recommendation id identifying the media item being recommended and a sending user id identifying the sending user of the media item being recommended.

25. The server of claim 10, wherein the server is further operative to receive a play or usage action for a media item from a play user.

26. The server of claim 25, wherein to determine if the media item associated with the play or usage action was previously recommended to the play user, the server is operative to determine if the play user is the recipient user in the recommendation path table for the media item associated with the play or usage action.

27. The server of claim 26, wherein the server is further operative to alter a recommendation rating for the media item associated with the play or usage action if the media item associated with the play or usage action was previously recommended to the play user.

28. The server of claim 10, wherein the server is further operative to send the recommendation rating associated with the media item to a user device.

29. The server of claim 10, wherein the server is further operative to receive a request for the recommendation rating associated with the media item.

30. The server of claim 29, wherein the server is further operative to send the requested recommendation rating associated with the media item to a requester in response to receiving the request.

31. The server of claim 10, wherein to alter the recommendation rating associated with the media item in response to receiving the report of a media item recommendation, the server is operative to at least one of increase the recommendation rating associated with the media item in response to receiving the report and decrease the recommendation rating associated with the media item in memory in response to receiving the report.

32. The server of claim 10, wherein to alter the recommendation rating in response to receiving the report of the play or usage action, the server is operative to alter the recommendation rating in response to receiving the report of the play or usage action if the media item was previously recommended to the play user sending the report of the play or usage action.

33. The server of claim 32, wherein to alter of the recommendation rating for the media item associated with the play or usage action if the media item associated with the play or usage action was previously recommended to the play user sending the report of the play or usage action, the server is operative to:

increase the recommendation rating for the media item if the play or usage action occurs within a prescribed period of time; and decrease the recommendation rating for the media item if the play or usage action does not occur within a prescribed period of time.

34. The server of claim 10, wherein the recommendation rating is a relative recommendation rating comprised of one or more rating levels.

35. The server of claim 10, wherein the server is comprised from the group consisting of a recommendation server, a peer device, and a super peer device.

* * * * *